United States Patent
Fukuguchi et al.

(10) Patent No.: US 7,426,624 B2
(45) Date of Patent: Sep. 16, 2008

(54) STORAGE MANAGEMENT COMPUTER PROGRAM PRODUCT AND GROUPING METHOD FOR STORAGE GROUPS

(75) Inventors: Hitoshi Fukuguchi, Odawara (JP); Kyosuke Achiwa, Odawara (JP); Masafumi Nozawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 11/138,500

(22) Filed: May 27, 2005

(65) Prior Publication Data

US 2006/0212673 A1    Sep. 21, 2006

(30) Foreign Application Priority Data

Mar. 17, 2005   (JP) .............................. 2005-077997

(51) Int. Cl.
*G06F 12/00* (2006.01)
*G06F 13/00* (2006.01)

(52) U.S. Cl. .................... 711/173; 711/170; 711/163

(58) Field of Classification Search ............. 711/163, 711/170, 173
See application file for complete search history.

(56) References Cited

U.S. PATENT DOCUMENTS

| 7,185,142 B2* | 2/2007 | Yagi et al. ................ 711/112 |
| 2003/0172069 A1 | 9/2003 | Uchiyama et al. |
| 2006/0064560 A1* | 3/2006 | Mizuno et al. ............. 711/164 |
| 2006/0069861 A1* | 3/2006 | Amano ..................... 711/114 |

FOREIGN PATENT DOCUMENTS

JP   2003330622   11/2003

* cited by examiner

*Primary Examiner*—Hyung Sough
*Assistant Examiner*—Mardochee Chery
(74) *Attorney, Agent, or Firm*—Mattingly, Stanger, Malur & Brundidge, P.C.

(57) ABSTRACT

A method for grouping a plurality of storage resources provided by a storage system into storage groups. Storage management software obtains storage resource configuration information set for each of a number of logical partitions in the storage system and groups the storage resources into storage groups such that the storage resource group configuration individually set for the logical partitions in the storage system matches the group configuration of the storage resources constituting the storage groups.

6 Claims, 26 Drawing Sheets

LOGICAL GROUP TABLE 801

| LOGICAL GROUP NUMBER | STORAGE GROUP OR LDEV |
|---|---|
| A | grpB , grpE |
| B | LDEV1 , LDEV2 |
| C | |
| D | grpF |
| E | LDEV3 |
| F | LDEV4 , LDEV5 , LDEV6 |
| ⋮ | ⋮ |

Fig.9

STORAGE GROUP TABLE 802

| LDEV NUMBER | STORAGE GROUP NUMBER |
|---|---|
| 0 | STORAGE GROUP0 |
| 1 | STORAGE GROUP0 |
| 2 | STORAGE GROUP1 |
| ⋮ | ⋮ |
| n | STORAGE GROUPg |
| ⋮ | ⋮ |
| N | STORAGE GROUPG |

Fig.10

POST-PARTITION DIVISION STORAGEGROUP TABLE 803

| LDEV NUMBER | STORAGE GROUP NUMBER |
|---|---|
| 0 | |
| 1 | |
| 2 | |
| ⋮ | ⋮ |
| n | |
| ⋮ | ⋮ |
| N | |

Fig.11

MANAGEMENT SERVER ADMINISTRATOR TABLE 804

| USER ID | PASSWORD | MANAGED OBJECTS |
|---|---|---|
| ID1 | PASSWORD1 | STORAGE GROUP1 |
| ID2 | PASSWORD2 | STORAGE GROUP2 |
| ⋮ | ⋮ | ⋮ |
| ID3 | PASSWORD3 | STORAGE GROUP3 |

Fig.12

MANAGEMENT SOFTWARE STORAGE ADMINISTRATOR TABLE 805

| USER ID | PASSWORD | MANAGED OBJECTS |
|---|---|---|
| ID4 | PASSWORD4 | SUBSYSTEM |
| ID5 | PASSWORD5 | SLPR2,SLPR4 |
| ⋮ | ⋮ | ⋮ |
| ID6 | PASSWORD6 | SLPR3 |

Fig.13

STORAGE GROUP ALLOCATION-STATE TABLE ~806

| STORAGE GROUP NUMBER | ALLOCATION STATE |
|---|---|
| 0 | 1 |
| 1 | 1 |
| 2 | 0 |
| ⋮ | ⋮ |
| g | 1 |
| ⋮ | ⋮ |
| G | 1 |

Fig.14

STORAGE ADMINISTRATOR TABLE ~901

| USER ID | PASSWORD | MANAGED OBJECTS |
|---|---|---|
| ID4 | PASSWORD4 | SUBSYSTEM |
| ID5 | PASSWORD5 | SLPR2,SLPR4 |
| ⋮ | ⋮ | ⋮ |
| ID6 | PASSWORD6 | SLPR6 |

Fig.15

LDEV PARTITION TABLE ~902

| SLPR NUMBER | LDEV NUMBER |
|---|---|
| 0 | 0,1 |
| 1 | 4,8,9 |
| 2 | 2,5,7 |
| ⋮ | ⋮ |
| m | 3,n |
| ⋮ | ⋮ |
| M | 6,N |

Fig.16

PORT PARTITION TABLE ~903

| SLPR NUMBER | PORT NUMBER |
|---|---|
| 0 | 1 |
| 1 | 3,5 |
| 2 | 2 |
| ⋮ | ⋮ |
| m | 4,p |
| ⋮ | ⋮ |
| M | O,P |

Fig.17

CACHE PARTITION ADDRESS TABLE ~904

| CACHE NUMBER | ADDRESS AREA |
|---|---|
| 0 | 0x00000~0x0FFFF |
| 1 | 0x10000~0x1FFFF |
| 2 | 0x20000~0x2FFFF |
| ⋮ | ⋮ |
| c | 0xA0000~0xAFFFF |
| ⋮ | ⋮ |
| C | 0xF0000~0xFFFFF |

Fig.18

CACHE PARTITION TABLE ~905

| SLPR NUMBER | CACHE NUMBER |
|---|---|
| 0 | 2 |
| 1 | 3,4 |
| 2 | 0 |
| ⋮ | ⋮ |
| m | 5,c |
| ⋮ | ⋮ |
| M | 1,C |

Fig.19

LDEV ALLOCATION-STATE TABLE ~906

| LDEV NUMBER | ALLOCATION STATE |
|---|---|
| 0 | 0 |
| 1 | 0 |
| 2 | 2 |
| ⋮ | ⋮ |
| n | m |
| ⋮ | ⋮ |
| N | M |

Fig.20

PORT ALLOCATION-STATE TABLE ~907

| PORT NUMBER | ALLOCATION STATE |
|---|---|
| 0 | M |
| 1 | 0 |
| 2 | 2 |
| ⋮ | ⋮ |
| p | m |
| ⋮ | ⋮ |
| P | M |

Fig.21

CACHE ALLOCATION-STATE TABLE ~908

| CACHE NUMBER | ALLOCATION STATE |
|---|---|
| 0 | 2 |
| 1 | M |
| 2 | 0 |
| ⋮ | ⋮ |
| c | m |
| ⋮ | ⋮ |
| C | M |

Fig.22

SLPR ALLOCATION-STATE TABLE ~909

| SLPR NUMBER | ALLOCATION STATE |
|---|---|
| 0 | 1 |
| 1 | 1 |
| 2 | 1 |
| 3 | 0 |
| ⋮ | ⋮ |
| m | 1 |
| ⋮ | ⋮ |
| M | 1 |

Fig. 36

POST-PARTITION DIVISION STORAGE GROUP TABLE

| LDEV NUMBER | STORAGE GROUP NUMBER |
|---|---|
| 0 | STORAGE GROUP 0 |
| 1 | STORAGE GROUP 0 |
| 2 | STORAGE GROUP 2 |
| ..... | ..... |
| n | STORAGE GROUP m |
| ..... | ..... |
| N | STORAGE GROUP M |

LDEV PARTITION TABLE A

| SLPR NUMBER | LDEV NUMBER |
|---|---|
| 0 | 0,1 |
| 1 | 4,8,9 |
| 2 | 2,5,7 |
| ..... | ..... |
| m | 3,n |
| ..... | ..... |
| M | 6,N |

STORAGE MANAGEMENT COMPUTER PROGRAM PRODUCT AND GROUPING METHOD FOR STORAGE GROUPS

CROSS-REFERENCES TO RELATED APPLICATIONS

This application relates to and claims priority from Japanese Patent Application No. 2005-077997, filed on Mar. 17, 2005, the entire disclosure of which is incorporated herein by reference.

BACKGROUND OF THE INVENTION

The present invention relates to a technique for grouping a plurality of storage resources provided by a storage system into storage groups.

Lately, storage consolidation—by which individual storage units for each server located at different places are consolidated at one place and connected to server groups via a storage-dedicated network such as a Storage Area Network (SAN)—has become popular. One operational system of the storage consolidation is one where one storage subsystem is shared among a plurality of customers. For example, Japanese Patent Laid-Open Publication No. 2003-330622 proposes a technique, which is employed in an operational system for sharing one storage subsystem among plural users, for deciding, when a request to access a logical volume is received from a user, whether or not to grant access on the basis of access right information defined for each user regarding respective logical volumes stored on respective disk devices, thereby managing access from the users to the plural disk devices.

SUMMARY OF THE INVENTION

The inventor of the present invention examined, as one operational system for storage consolidation, having a storage subsystem to provide a Storage Logical Partition (SLPR) function, by which, resources in a storage subsystem are logically divided into a plurality of partitions and each partition is provided to users as an independent storage subsystem.

However, regarding the storage subsystem, when the users and administrator(s) separately manage the resources in the storage subsystem having the SLPR function, the following inconveniences may arise.

For example, there may be the case where, due to human-error setting mistakes or similar, the group setting of the resources in the respective SLPRs set by the administrator(s) does not match the group setting of storage groups set by the users for the storage management software. When this kind of mismatch occurs, the kind of inconvenience occurs where, for example, a logical device (LDEV) is set as company A's resource in the SLPR grouping set for the storage subsystem, however, the same LDEV is set as company B's resource in the storage group grouping set for the storage management software, therefore, company B can consult the LDEV. In an operational system for sharing one storage subsystem among plural users, it is undesirable for one user to be able to access the resources allocated to other users.

Moreover, if a super-user groups the storage resources to match the SLPR grouping set by the subsystem administrator(s), the super-user is burdened with an enormous amount of labor.

Such inconveniences as the above may occur in cases where the storage group grouping set by the users for the storage management software is valid only in the storage management software, and is completely independent from the SLPR grouping set by the subsystem administrator(s).

The present invention was made considering the above problems and aims to solve the mismatch between the storage resource groupings set for the respective logical partitions in the storage system and the storage group groupings set for the storage management software.

In order to achieve the above object, the computer program product of the present invention is a computer program product having a computer program for causing a computer system to execute processing for grouping a plurality of storage resources provided by a storage system into storage groups, the computer program causing the computer system to execute the step of: obtaining storage resource configuration information set for each of a number of logical partitions in the storage system; and grouping the storage resources into storage groups such that a storage resource group configuration individually set for the logical partitions in the storage system matches a group configuration of the storage resources constituting the storage groups. With this computer program product, it is possible to solve the mismatch between the storage resource groupings set for the respective logical partitions in the storage subsystem and the storage group groupings set for the storage management software.

The storage resources are various kinds of physical resources and logical resources such as ports, cache memory (disk cache), and LDEVs. The storage resource configuration information set for each of the logical partitions is, for example, grouping information of the storage resources in the respective logical partitions.

It is preferable that the administrator(s) of the storage subsystem having the SLPR function are of the following types: a subsystem administrator who is authorized to manage the resource configuration information of the entire subsystem; and partition administrators who are authorized to manage the resource configuration information of the respective SLPRs. These administrators execute resource management for the storage resources such as ports, LDEVs, cache memory, etc. A user cannot refer to or manage logical partitions (logically divided unit) other than those allocated to himself/herself.

On the other hand, it is preferable that users of this type of storage subsystem are of the following types: a super-user who is authorized to manage all of the storage groups; and users who are authorized to manage storage groups respectively allocated to themselves. The super-users and users employ the storage management software to group the storage resources into storage groups.

When the computer program product according to the present invention groups the storage resources constituting storage groups, it may update the associations between the storage groups and the administrators who manage the storage groups, on the basis of partition administrator identification information set for the respective logical partitions in the storage system. It is preferable that the partition administrators set for the respective logical partitions are identical to the administrators of the storage groups corresponding to the logical partitions. The partition administrator identification information is, for example, user IDs and passwords.

Moreover, the computer program product according to the present invention may group the storage group-constituting storage resources subject to an approval of storage group administrator(s). The approval of the storage group administrator(s) means an approval to permit grouping of the storage group-constituting storage resources so that the group configurations thereof match the storage resource group configurations set for the respective logical partitions in the storage system.

According to another aspect, the computer program product according to the present invention is a computer program product having a computer program for causing a computer system to execute processing for grouping a plurality of storage resources provided by a storage system into storage groups, the computer program causing the computer system to execute the steps of: obtaining storage resource configuration information set for each of a number of logical partitions in the storage system; and executing user authentication for a login user who tries to change the configuration of the storage groups to judge whether or not the login user is an authorized user who is allowed to change the configuration of the storage groups; when the login user is judged to be the authorized user, prompting the authorized user to determine whether or not to change the configuration of one or more of the storage groups; and when the authorized user determines to change the configuration of the storage groups, grouping the storage resources into storage groups such that a storage resource group configuration individually set for the logical partitions in the storage system matches a group configuration of the storage resources constituting the storage groups. Because the authorized user (administrator) is required to determine whether or not to change the configurations of the storage groups, he/she can select, in terms of management and performance guarantee of the storage system, whether or not to reflect the storage resource group configurations set for the respective logical partitions in the storage system, in the group configurations of the storage group-constituting storage resources.

Preferable examples of a medium include optical recording media (optically readable media such as a CD-RAM, a CD-ROM, a DVD-RAM, a DVD-ROM, a DVD-R, a PD disk, a MD disk, or a MO disk); magnetic media (magnetically readable media such as a flexible disk, a magnetic card, or a magnetic tape): and memory devices (for example, a semiconductor memory device such as a DRAM, and a ferroelectric memory device such as a FRAM).

According to the present invention, it is possible to solve the mismatch between the group configurations because the storage management software groups the storage group-constituting storage resources such that the group configurations of the storage group-constituting storage resources match the storage resources group configurations set for the respective logical partitions in the storage system.

BRIEF DESCRIPTION OF THE DRAWINGS

FIG. 9 illustrates a storage group table.

FIG. 10 illustrates a post-partition division storage group table.

FIG. 11 illustrates a management server administrator table.

FIG. 12 illustrates a management software storage administrator table.

FIG. 13 illustrates a storage group allocation-state table.

FIG. 14 illustrates a storage administrator table.

FIG. 15 illustrates a LDEV partition table.

FIG. 16 illustrates a port partition table.

FIG. 17 illustrates a cache partition address table.

FIG. 18 illustrates a cache partition table.

FIG. 19 illustrates an LDEV allocation-state table.

FIG. 20 illustrates a port allocation-state table.

FIG. 21 illustrates a cache allocation-state table.

FIG. 22 illustrates a SLPR allocation-state table.

FIG. 36 shows a concept for reflecting a grouping.

DETAILED DESCRIPTION OF THE INVENTION

An embodiment of the present invention is explained hereinafter with reference to the drawings.

Figure 1:
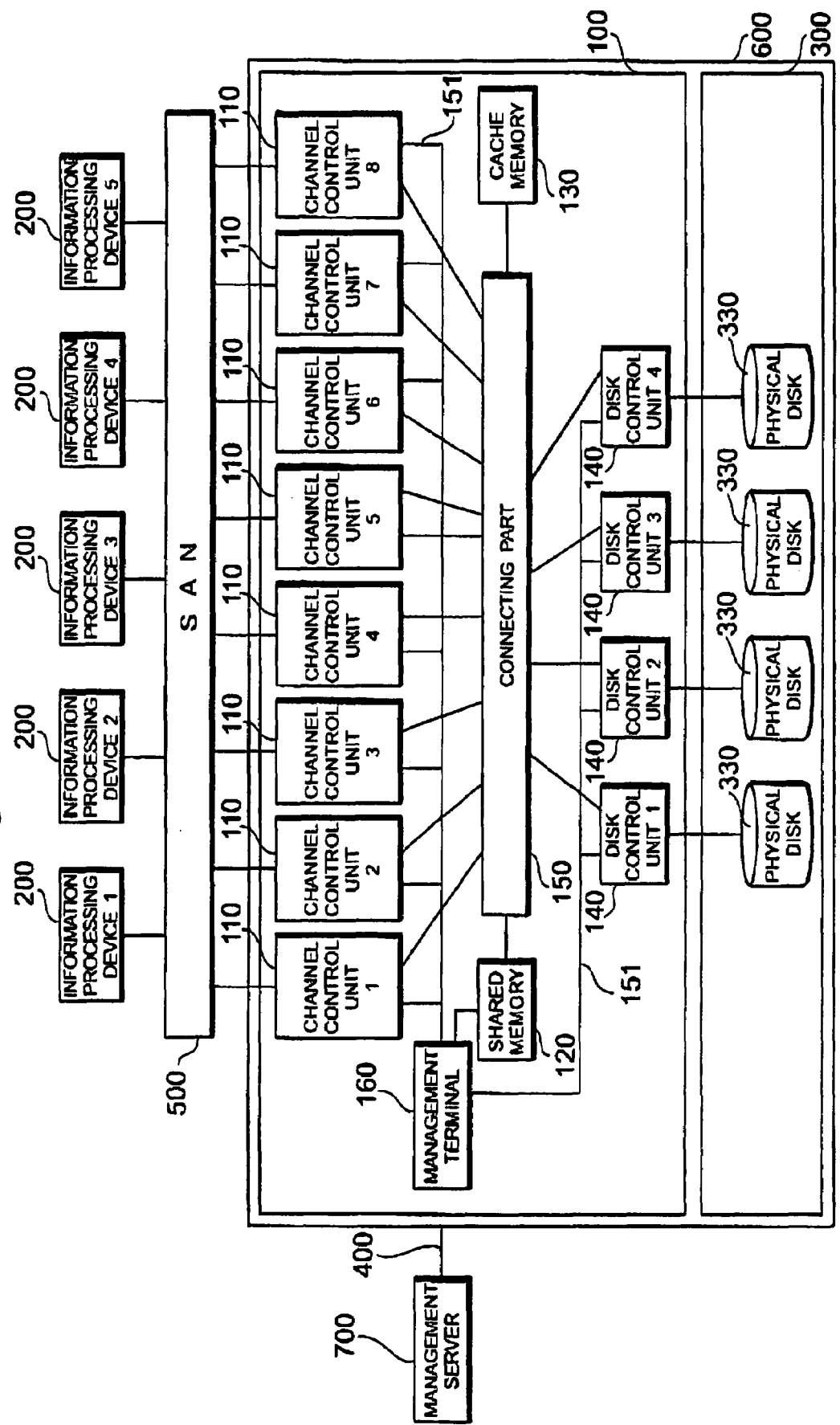
FIG. 1 shows the configuration of a storage subsystem according to an embodiment of the present invention.

FIG. 1 shows a system configuration of the entire storage subsystem 600 according to this embodiment. The storage subsystem 600 is mainly composed of a disk controller 100 and a storage apparatus 300. The disk controller 100 executes, for example, controls for data input/output to/from the storage apparatus 300 in accordance with commands received from information processing devices 200. The disk controller 100 executes, for example, various processing such as setting and changing of the configuration information of the storage subsystem 600 in accordance with commands received from an administrator server 700.

The information processing devices 200 are host systems such as personal computers, work stations, or mainframe computers and are used for automatic teller systems in banks, airline seat reservation systems and the like. The storage subsystem 600 has a Storage Logical Partition (SLPR) function and may be shared among a plurality of users. For example, the system may be operated such that user A owns the information processing devices 1 and 2 (200) while user B owns the information processing devices 3, 4, and 5 (200).

The information processing devices 200 are connected to the disk controller 100 via a SAN 500 in a communication-enabling manner. The SAN 500 is a network for transmitting data between itself and the information processing devices 200 in blocks, which are management units of data in the storage resources provided by the storage apparatus 300. A communication protocol used between the information processing devices 200 and the disk controller 100 via the SAN 500 is, for example, a fiber channel protocol.

The information processing devices 200 and the disk controller 100 are not necessarily connected to each other via the SAN 500, but they may be connected via, for example, a Local Area Network (LAN) or directly connected to each other without involving a network. If they are connected via a LAN, communications may be made according to Transmission Control Protocol/Internet Protocol (TCP/IP). On the other hand, if they are directly connected to each other without involving a network, communications may be made according to a communication protocol such as Fibre Connection (FICON: registered trademark), Enterprise System Connection (ESCON: registered trademark), Advanced Connection Architecture (ACONARC: registered trademark), or Fibre Connection Architecture (FIBARC: registered trademark).

The management server 700 is connected via an external LAN to a management terminal 160. The external LAN 400 is configured by, for example, the Internet or private line(s). Communications between the management server 700 and the management terminal 160 via the external LAN 400 are made according to a communication protocol such as TCP/IP.

The storage apparatus 300 includes a plurality of physical disk drives 330. The physical disk drives 330 are hard disk drives such as Advanced Technology Attachment (ATA) disk drives, Small Computer System Interface (SCSI) disk drives, or fiber channel disk drives. It is possible to form a Redundant Arrays of Inexpensive Disks (RAID) configuration with the plural disk drives that are arranged in arrays. A group of the plural hard disk drives that constitute a RAID configuration are called an ECC group. In physical volumes that are storage areas provided by the physical disk drives 330, logical storage areas, that is, LDEVs can be set.

The disk controller 100 and the storage apparatus 300 may be either connected via a network or connected directly without involving a network, or they may be integrated together.

The disk controller 100 includes: channel control units 110; a shared memory 120; a cache memory 130; disk control units 140; a management terminal 160; and a connecting part 150.

The disk controller 100 executes, by means of the channel control units 110, communications with the information processing devices 200 via the SAN 500. The channel control units 110 include communication interfaces for conducting communications with the information processing devices 200, and have the function of transmitting data input/output commands etc. between themselves and the information processing devices 200. The channel control units 110 are connected to one another and also to the management terminal 160 via an internal LAN (shared bus), thereby can install, from the management terminal 160, micro programs and the like that the channel control units execute. The configuration of the channel control units 110 is described later in detail.

The connecting part 150 connects the channel control units 110, the shared memory 120, the cache memory 130, the disk control units 140, and the management terminal 160 to one another. Through this connecting part 150, transmission of data and commands between the channel control units 110, the shared memory 120, the cache memory 130, the disk control units 140, and the management terminal 160 is executed. The connecting part 150 is configured with, for example, a crossbar switch or similar.

The shared memory 120 and the cache memory 130 are memory devices shared between the channel control units 110 and the disk control units 140. The shared memory 120 is mainly used for storing the configuration information of the resources and various commands and the like. The cache memory 130 is mainly used for temporarily storing data to be read from or written to the physical disks 330.

Incidentally, the shared memory 120 stores a storage administrator table 901 for conducting SLPR resource management; an LDEV partition table 902; a port partition table 903; a cache partition address table 904; a cache partition table 905; an LDEV allocation-state table 906; a port allocation-state table 907; a cache allocation-state table 908; a SLPR allocation-state table 909 (see FIGS. 14 to 22). These tables 901 to 909 will be described later in details.

For example, when a channel control unit 110 receives a data input/output request from an information processing device 200 and the request is a write command, it writes the write command to the shared memory 120 and writes the write data received from the information processing device 200 to the cache memory 130.

On the other hand, each of the disk control units 140 monitors the shared memory 120 at all times and when it detects that the write command has been written to the shared memory 120, it reads out dirty data from the cache memory 130 in accordance with the write command and destages the dirty data onto a physical disk drive 330.

When a channel control unit 110 receives a data input/output request from an information processing device 200 and the request is a read command, it checks whether or not the data to be read exists in the cache memory 130. At this time, if the data to be read exits in the cache memory 130, the channel control unit 110 reads the data from the cache memory 130 and transmits it to the information processing device 200.

If the data to be read does not exist in the cache memory 130, the channel control unit 110 writes the read command to the shared memory 120. Each of the disk control units 140 monitors the shared memory 120 at all times and when it detects that the read command has been written to the shared memory 120, it reads the data to be read from the storage apparatus 300, writes the data to the cache memory 130, and writes, to the shared memory 120, the fact that the data has been read out and written. Then, the channel control unit 110 detects that the data to be read has been written to the cache memory 130, reads the data from the cache memory 130, and transmits it to the information processing device 200.

In this way, data transmission is conducted between the channel control units 110 and the disk control units 140 via the cache memory 130. Of the data stored on the physical disk drives 330, data read/written by the channel control units 110 and the disk control units 140 is temporarily written to the cache memory 130.

Incidentally, in addition to the configuration in which data read/write commands are transmitted indirectly from the channel control units 110 to the disk control units 140 through the shared memory 120, there may be another configuration in which these data read/write commands may be transmitted without involving the shared memory 120. In still another configuration, it is possible to have the channel control units 110 to provide the function of the disk control units 140 in order to execute data input/output controls.

The disk control units 140 are connected the data-storing physical disk drives respectively in a communication-enabling manner, thereby executing control of the storage apparatus. For example, the disk control units 140, as mentioned above, read/write data from/to the physical disk drives 330 in accordance with the data input/output requests transmitted from the information processing devices 200 to the channel control units 110.

The disk control units 140 are connected to one another and to the management terminal 160 via the internal LAN 151 and communication is possible therebetween. As a result, the micro programs or similar to be executed by the disk control units 140 can be transmitted from the management terminal 160 and installed on the disk control units 140. The configuration of the disk control units 140 will be described later in detail.

In this embodiment, explanations are given for the case in which the shared memory 120 and the cache memory 130 are provided separately from the channel control units 110 and the disk control units 140. However, this embodiment is not limited to such a case. For example, the shared memory 120 and the cache memory 130 may be individually provided to the respective channel control units 110 and the respective disk control units 140. In this case, the connecting part 150 connects the channel control units 110 and the disk control units 140 to one another, each having an individual shared memory 120 and a cache memory 130.

It is possible to have at least some of the channel control units 110, disk control units 140, connecting part 150, shared memory 120, and cache memory 130 be integrated together.

The management terminal 160 is a computer for managing the storage subsystem 600. A subsystem administrator or partition administrators operate the management terminal 160 to conduct: SLPR resource management; configuration setting of the physical disk drives; setting of paths between the information processing devices 200 and the channel control units 110; and installing of micro programs or similar to be executed by the channel control units 110 and the disk control units 140. The SLPR resource management represents setting, for example, the allocation of the resources (ports, LDEVS, cache memory, etc.) to the respective SLPRs, and addition and deletion of the resources. The configuration setting of the physical disk drives 330 means, for example, the addition or deletion of the physical disk drives 330, and change of the RAID configuration (for example, from RAID 1 to RAID 5). Moreover, with the management terminal 160, it is possible to confirm the operational condition of the storage subsystem 600, specify defective parts, and install operating systems to be executed by the channel control units 110. These various settings and controls may be made using a management terminal 160 user interface.

The management terminal 160 may be contained in the disk controller 100 or configured as an external structure. The management terminal 160 may be a computer prepared only for managing the disk controller 100 and the storage apparatus 300 or a general computer with a storage system 600-managing function equipped therein.

Figure 2:
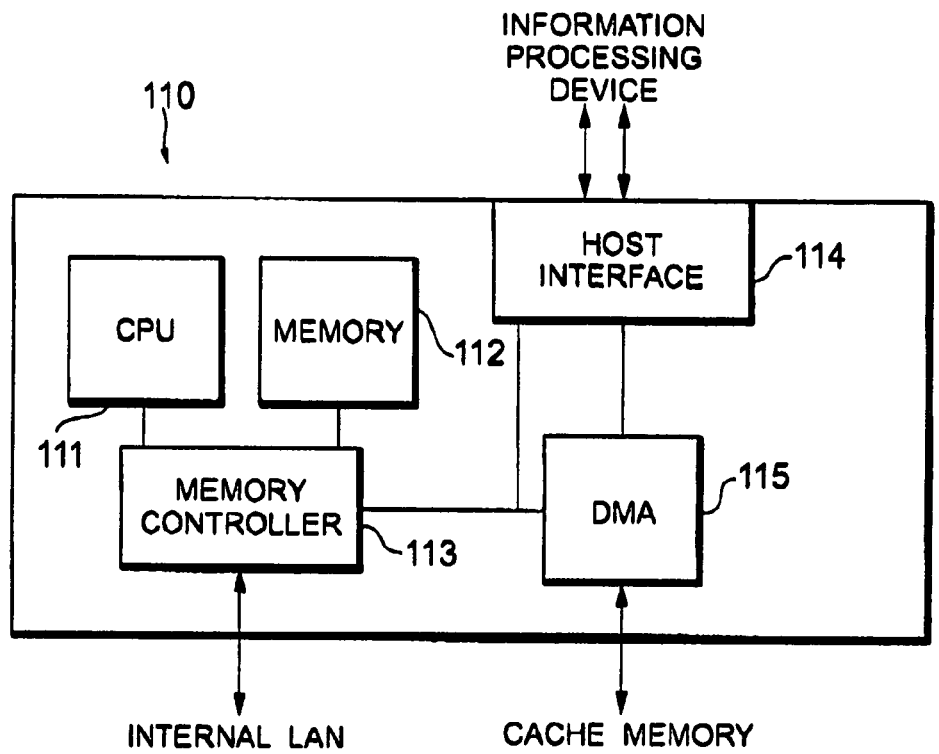
FIG. 2 shows a system configuration of a channel control unit.

FIG. 2 shows a system configuration of a channel control unit 110. The channel control unit 110 is composed of: a CPU 111; a memory 112; a memory controller 113; a host interface 114; and a Direct Memory Access (DMA) 115. The CPU 111 operates based on channel adapter firmware provided in the memory 112 and transmits/receives data to/from the DMA 115 or the host interface 114 via the memory controller 113. The host interface 114 includes a protocol controller for a protocol such as a fiber channel protocol or an SCSI protocol, and provides a communication interface function for conducting communication with the information processing devices 200. The host interface 114 has two ports. Upon the request from the CPU 111, the DMA unit 115 DMA-trans-fers, to the cache memory 130, data received from an information processing device 200, or it DMA unit DMA-transfers data stored in the cache memory 130 to an information processing device 200.

Figure 3:
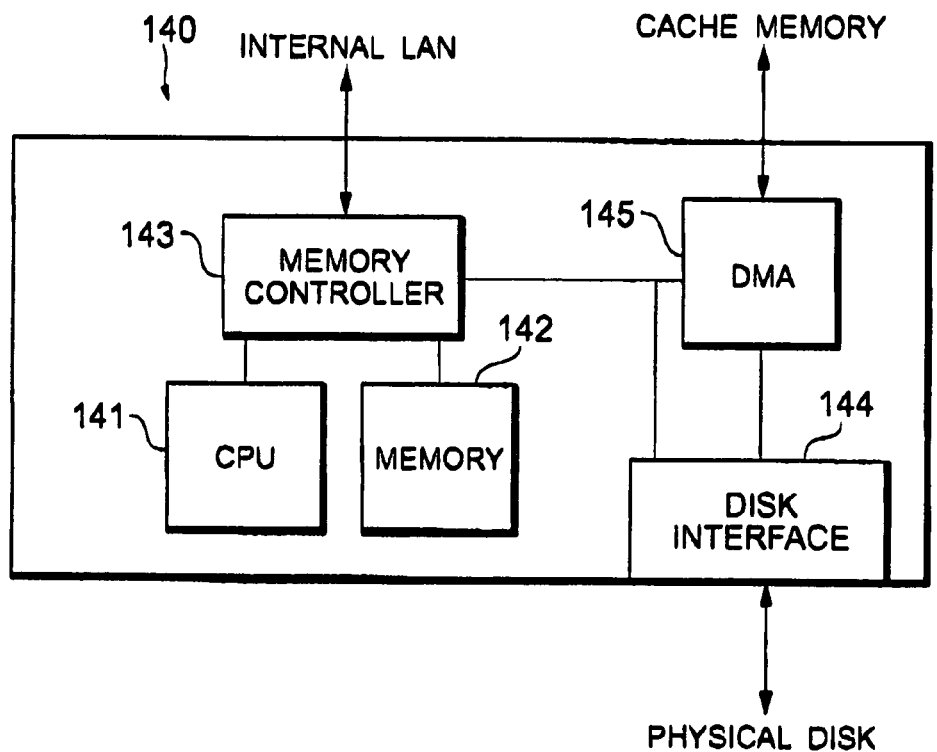
FIG. 3 shows a system configuration of a disk control unit.

FIG. 3 shows a system configuration of a disk control unit 140. The disk control unit 140 is composed of: a CPU 141; a memory 142; a memory controller 143; a disk interface 144; and a DMA 145. The CPU 141 operates based on disk adapter firmware provided in the memory 142 and transmits/receives data to/from the DMA 145 or the disk interface 144 via the memory controller 143. The disk interface 144 has a protocol controller for a protocol such as a fiber channel protocol or an SCSI protocol and provides a communication interface function for conducting communication with the physical disks 330. Upon the request from the CPU 141, the DMA 145 DMA-transfers data read from a physical disk 330 to the cache memory 130 or it DAM-transfers data stored on the cache memory 130 to a physical disk 330.

Figure 4:
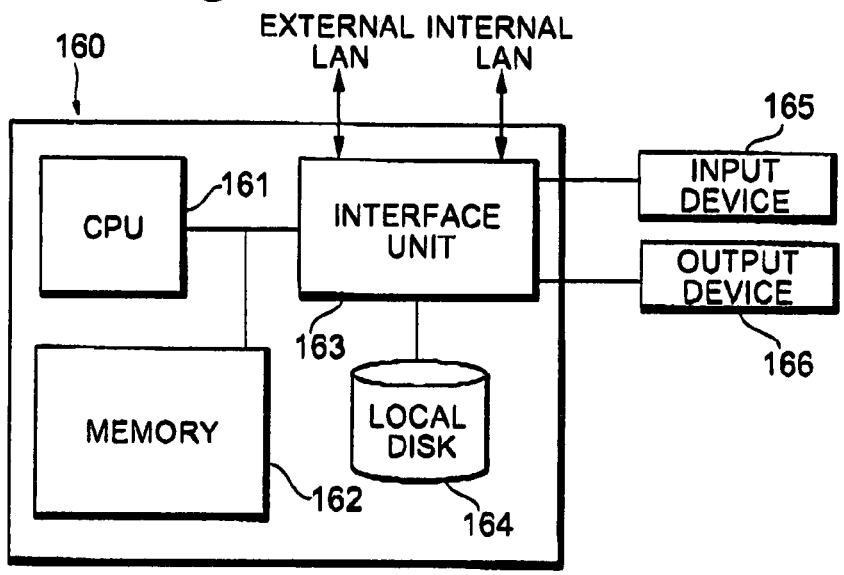
FIG. 4 shows a system configuration of a management terminal.

FIG. 4 shows a system configuration of the management terminal 160. The management terminal 160 is composed of: a CPU 161; a memory 162; an interface unit 163; a local disk 164; an input device 165; and an output device 166. The CPU 161 conducts various processing based on storage management firmware provided in the memory 162. The CPU 161 accesses the various tables in the shared memory 120 through the interface unit 163. Copies of those tables may be retained in the memory 162. With the copies retained in the memory 162, the CPU 161 need not access the shared memory 120 every time. The interface unit 163 has communication interfaces for the external LAN 400 and the internal LAN 151, and has the functions of receiving, via the external LAN 700, various management commands issued from the management server 700 and accessing the shared memory 120 via the internal LAN 151. The local disk 164 stores various information necessary for managing the storage subsystem 600. The input device 165 represents a keyboard, mouse, and so on. The subsystem administrator or the partition administrators operate the input device 165 and conduct the management of the SLPR resources in the storage subsystem 600. Examples of the output device 166 include a display, a printer and so on.

Figure 5:
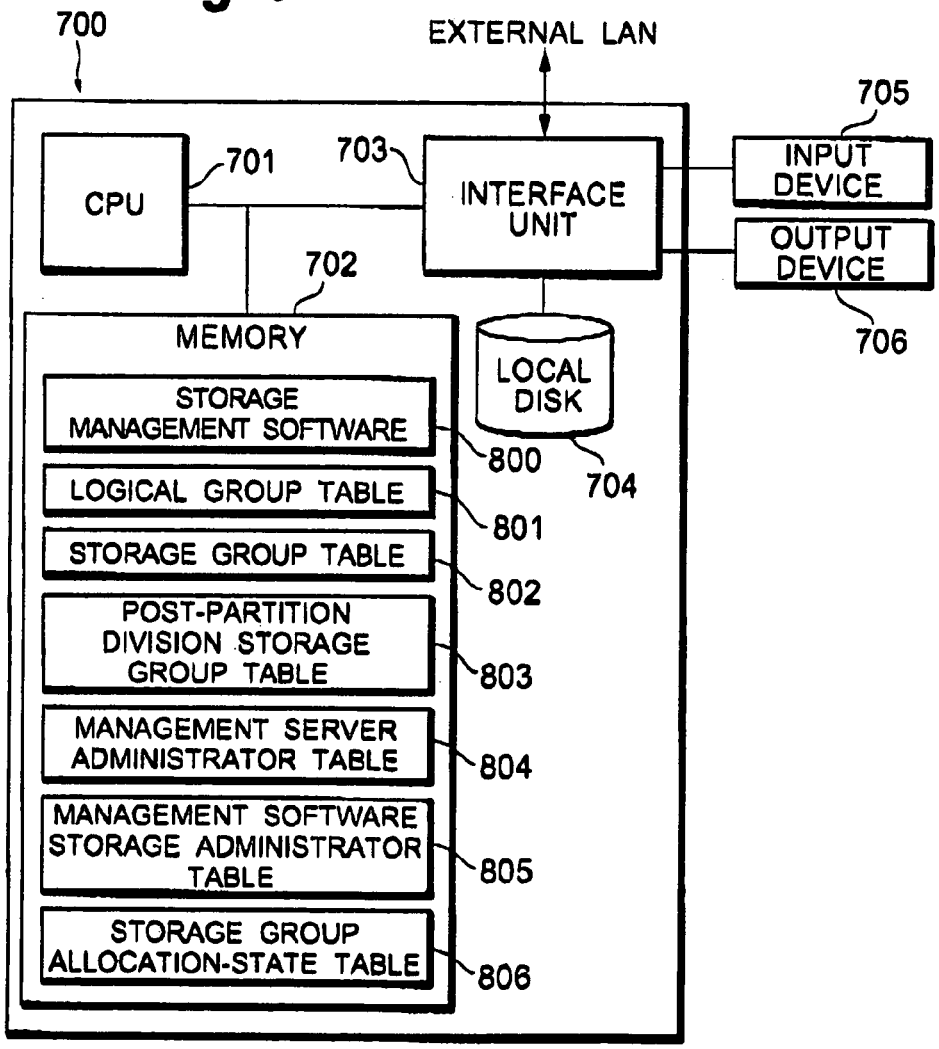
FIG. 5 shows a system configuration of a management server.

FIG. 5 shows a system configuration of the management server 700. the management server 700 is composed of: a CPU 701; a memory 702; an interface unit 703; a local disk 704; an input device 705; and an output device 706. The CPU 701 conducts various processing based on storage management software (the storage management program) provided in the memory 702. The interface unit 703 has a communication interface for the external LAN 400 and is capable of transmitting various management commands to the management terminal 160 via the external LAN 400. The local disk 704 stores various information necessary for managing the storage subsystem 600. The input device 705 represents a keyboard, a mouse, and so on. A super-user or users operate the input device 705 and set or change the configuration information of the storage subsystem 600. Examples of the output device 706 include a display, a printer, and so on.

Incidentally, the memory 702 stores: a logical group table 801; a storage group table 802; a post-partition division storage group table 803; a management server administrator table 804; a management software storage administrator table 805; and a storage group allocation-state table 806. These tables 801 to 806 will be explained later in detail.

Figure 6:
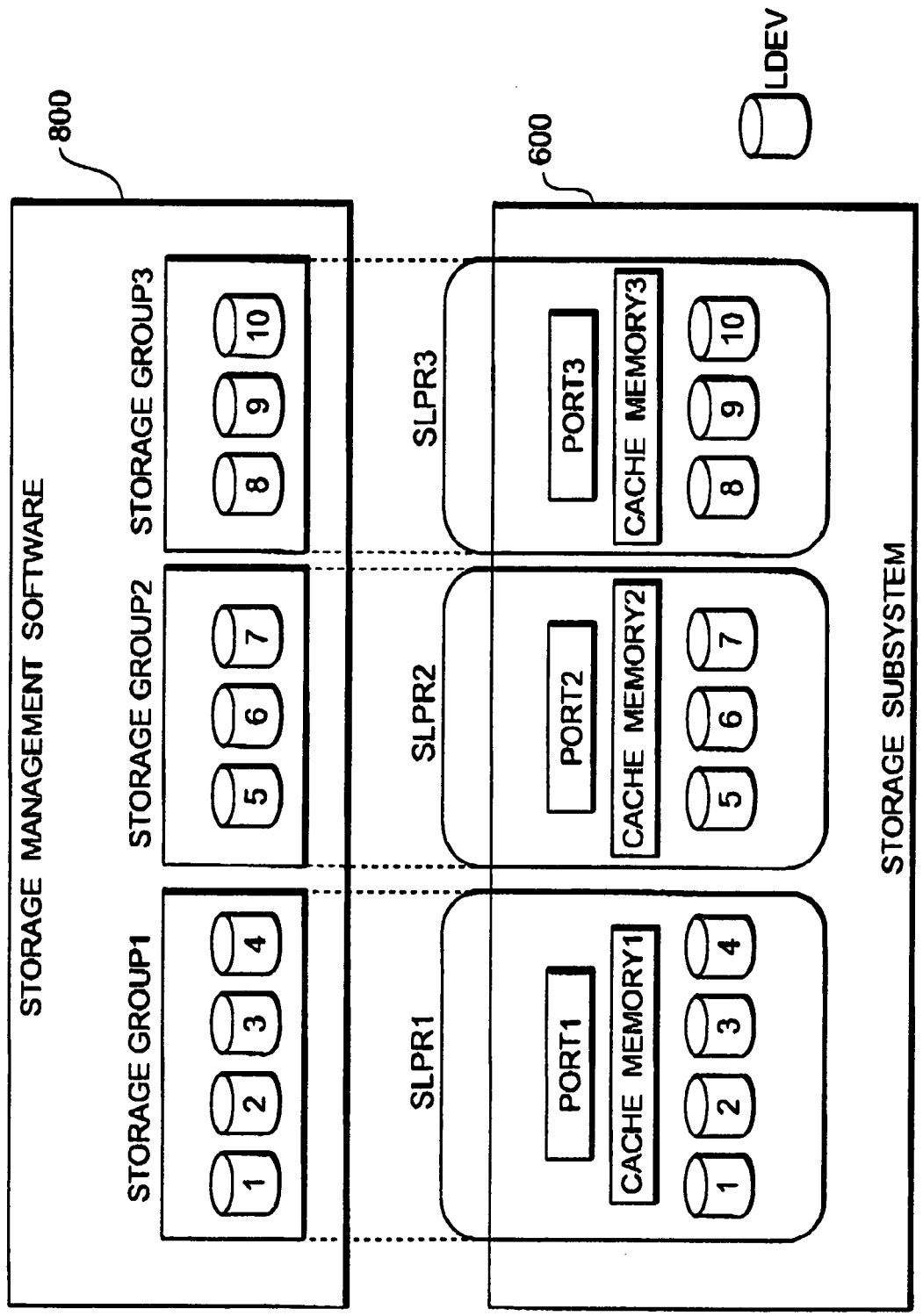
FIG. 6 shows associations between groupings.

FIG. 6 shows the associations between the groupings set for the storage subsystem 600 and that set for the storage management software 800. In the resource settings in the storage subsystem 600 side, the resources are grouped so that a port 1, a cache memory 1, and LDEVs 1 to 4 are allocated to an SLPR 1, a port 2, a cache memory 2, and LDEVs 5 to 7 are allocated to an SLPR 2, and a port 3, a cache memory 3, and LDEVs 8 to 10 are allocated to an SLPR 3. The ports 1 to 3 are divided units of the logically divided communication ports of the channel control units 110. The cache memories 1 to 3 are divided units of the logically divided storage areas in the cache memory 130. The LDEVs 1 to 10 are the LDEVs provided by the physical disks 330.

On the other hand, in the resource settings in the storage management software 800 side, the resources are grouped so that LDEVs 1 to 4 are allocated to a storage group 1, LDEVs 5 to 7 are allocated to a storage group 2, and LDEVs 8 to 10 are allocated to a storage group 3. Conventionally, the subsystem administrator used to make the resource settings for the storage subsystem 600 and the super-user used to make the resource settings for the storage management software 800. However, this embodiment adopts a configuration in which the resource settings made by the subsystem administrator for the storage subsystem 600 are automatically reflected in the resource settings for the storage management software 800. This point will be explained hereinafter in detail with reference to the drawings.

Incidentally, in the storage management software 800, the objects to be grouped are the storage resources such as LDEVs, ports, and cache memory. However, for convenience of explanation, this embodiment will be explained using the case in which the objects to be grouped in the storage management software 800 are only the LDEVs.

Figures 7, 8:
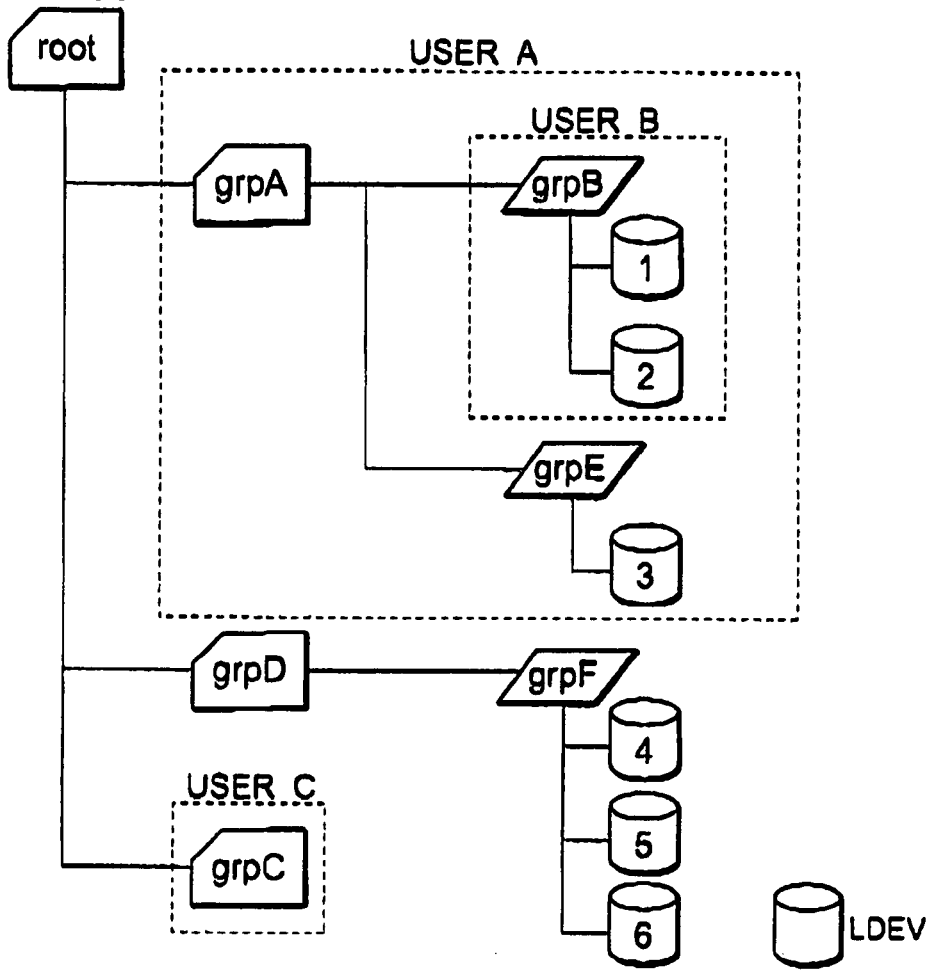
FIG. 7 shows a hierarchy configuration of logical groups.
FIG. 8 illustrates a logical group table.

FIG. 7 shows a hierarchy configuration of logical groups in the storage management software 800. The logical groups are divided into two types: hierarchy groups; and storage groups. A hierarchy group represents a logical group in which a single or plural storage groups are registered. In FIG. 7, the root, a grp A, a grp D, and a grp C are the hierarchy groups. In these hierarchy groups, LDEVs cannot be registered. A storage group represents a logical group in which a single or plural LDEVs are registered. In FIG. 7, a grp B, a grp E, and a grp F are the storage groups. In one storage group, a collection of the LDEVs existing in one storage subsystem 600 can be registered. The logical groups may be hierarchized. For example, an LDEV 2 may be indicated as "root¥grpA¥grpB¥LDEV2."

These logical groups are allocated to the users; accordingly, the LDEVs registered in the tiers including and below such allocated logical groups can be the objects managed by the users. In the example shown in the figure, user A manages the LDEVs 1 to 3 while user B manages the LDEVs 1 and 2. The grp C is allocated to user C; however, because the grp C has no storage groups registered therein, there is no LDEV managed by user C. The super-user manages all the LDEVs registered in the tiers including and below the root, and is authorized to allocate the logical groups to the respective users.

Incidentally, the hierarchy configuration of the logical groups and the allocation of the LDEVs to the respective storage groups that have been illustrated are only for convenience in explaining the concepts thereof and will have no influence on the interpretation of the various tables 801 to 806 and 901 to 909 that will be described later.

FIG. 8 shows the logical group table 801. The logical group table 801 indicates which storage group or LDEV belongs to which logical group. This table 801 records the associations between the "logical group numbers" and the "storage groups or LDEVs."

FIG. 9 shows the storage group table 802. The storage group table 802 indicates which LDEV belongs to which storage group and records the associations between the "LDEV numbers" and the "storage group numbers." Incidentally, for ease of explanation, FIG. 9 shows the case where it is assumed that the logical group hierarchy has one tier and each of the storage groups necessarily includes one or more LDEVs.

FIG. 10 shows the post-partition division storage group table 803, which indicates which post-partition division LDEV belongs to which storage group and records the associations between the "LDEV numbers" and the "storage group numbers." FIG. 10 shows an initialized state of the table 803 and has nothing recorded in the "storage group number" boxes for the respective LDEV numbers yet. When the resource setting is completed in the storage subsystem 600 side, numbers are recorded in the "storage group number" boxes for the respective LDEV numbers.

FIG. 11 shows the management server administrator table 804. This table 804 records the associations between the storage management software users' "user IDs" and "passwords" and "managed objects" for which the users have access authorization. Specifically, in the "management object" boxes, the numbers of the storage groups for which the users have access authorization are recorded.

FIG. 12 shows the management software storage administrator table 805. This table 805 records the associations between the "user IDs," "passwords," and "managed objects" that are necessary for logging in to the storage subsystem 600 when the storage management software 800 obtains the LDEV setting information of the storage subsystem 600. Specifically, the term "subsystem" is recorded in the "managed object" box for the subsystem administrator while SLPRs are recorded in the "managed object" boxes for the partition administrators, for which the partition administrators have access authorization. The users may have access authorization for plural SLPRs.

FIG. 13 shows the storage group allocation-state table 806, which indicates which storage group is allocated to which user and records the associations between the "storage group numbers" and the "allocation states." Specifically, when a storage group is not allocated to a user, "0" is recorded in the "allocation state" box for the storage group, while when a storage group has been allocated to a user, "1" is recorded in the "allocation state" box for the storage group.

FIG. 14 shows the storage administrator table 901, which is a table used by the management terminal 160 to judge whether or not the subsystem administrator or a partition administrator has access authorization when the subsystem administrator or the partition administrator tries to establish the resource settings for the storage subsystem 600. The table 901 records the associations between the "user IDs" and "passwords" necessary for user authentication and the "managed objects" for which the subsystem administrator and the partition administrator(s) have access authorization. Specifically, the term "subsystem" is recorded in the "managed object" box for the subsystem administrator and the SLPRs for which the partition administrator(s) have access authorization are recorded in the "managed object" boxes for the partition administrator(s). The administrator(s) may have access authorization to plural SLPRs.

FIG. 15 shows the LDEV partition table 902, which indicates which LDEV belongs to which SLPR and records the associations between the "SLPR numbers" and the "LDEV numbers." Incidentally, the resources that do not belong to any SLPR are recorded in the "LDEV number" box for SLPR 0.

FIG. 16 shows the port partition table 903, which indicates which port belongs to which SLPR and records the associations between the "SLPR numbers" and the "port numbers."

FIG. 17 shows the cache partition address table 904, which indicates the address areas of the individual cache memories, which are divided units of the logically divided cache memory, and records the associations between the "cache numbers" and the "address areas."

FIG. 18 shows the cache partition table 905, which indicates which cache memory, a divided unit of the logically divided cache memory, belongs to which SLPR. The table 905 records the associations between the "SLPR numbers" and the "cache numbers."

FIG. 19 shows the LDEV allocation-state table 906, which indicates whether the respective LDEVs are allocated to the SLPRs. The table 906 records the associations between the "LDEV numbers" and the "allocation states." Specifically, if an LDEV is not allocated to any SLPR, "0" is recorded in the "allocation state" box for the LDEV, while if an LDEV is allocated to any of the SLPRs, the "SLPR number" of the SLPR is recorded in the "allocation state" box for the LDEV.

FIG. 20 shows the port allocation-state table 907, which indicates whether the respective ports are allocated to the SLPRs. The table 907 records the associations between the "port numbers" and the "allocation states." Specifically, when a port is not allocated to any SLPR, "0" is recorded in the "allocation state" box for the port, while if a port is allocated to any of the SLPRs, the "SLPR number" of the SLPR is recorded in the "allocation state" box for the port.

FIG. 21 shows the cache allocation-state table 908, which indicates whether the individual cache memories, divided units of the logically divided cache memory, are allocated to the SLPRs. The table 908 records the associations between the "cache numbers" and the "allocation states." Specifically, when a cache memory is not allocated to any SLPR, "0" is recorded in the "allocation state" box for the cache memory, while when a cache memory is allocated to any of the SLPRs, the "SLPR number" of the SLPR is recorded in the "allocation state" box for the cache memory.

FIG. 22 shows the SLPR allocation-state table 909, which indicates whether at least one of the resources (ports, LDEVs, cache memories, etc.) is allocated to the SLPRs. The table 909 records the associations between the "SLPR numbers" and the "allocation states." Specifically, if a SLPR is not allocated any of the resources such as ports, LDEVs, or cache memories, "0" is entered for the "allocation state" box for the SLPR, while if a SLPR is allocated any of the resources, "1" is recorded in the "allocation box" for the SLPR.

Figure 23:
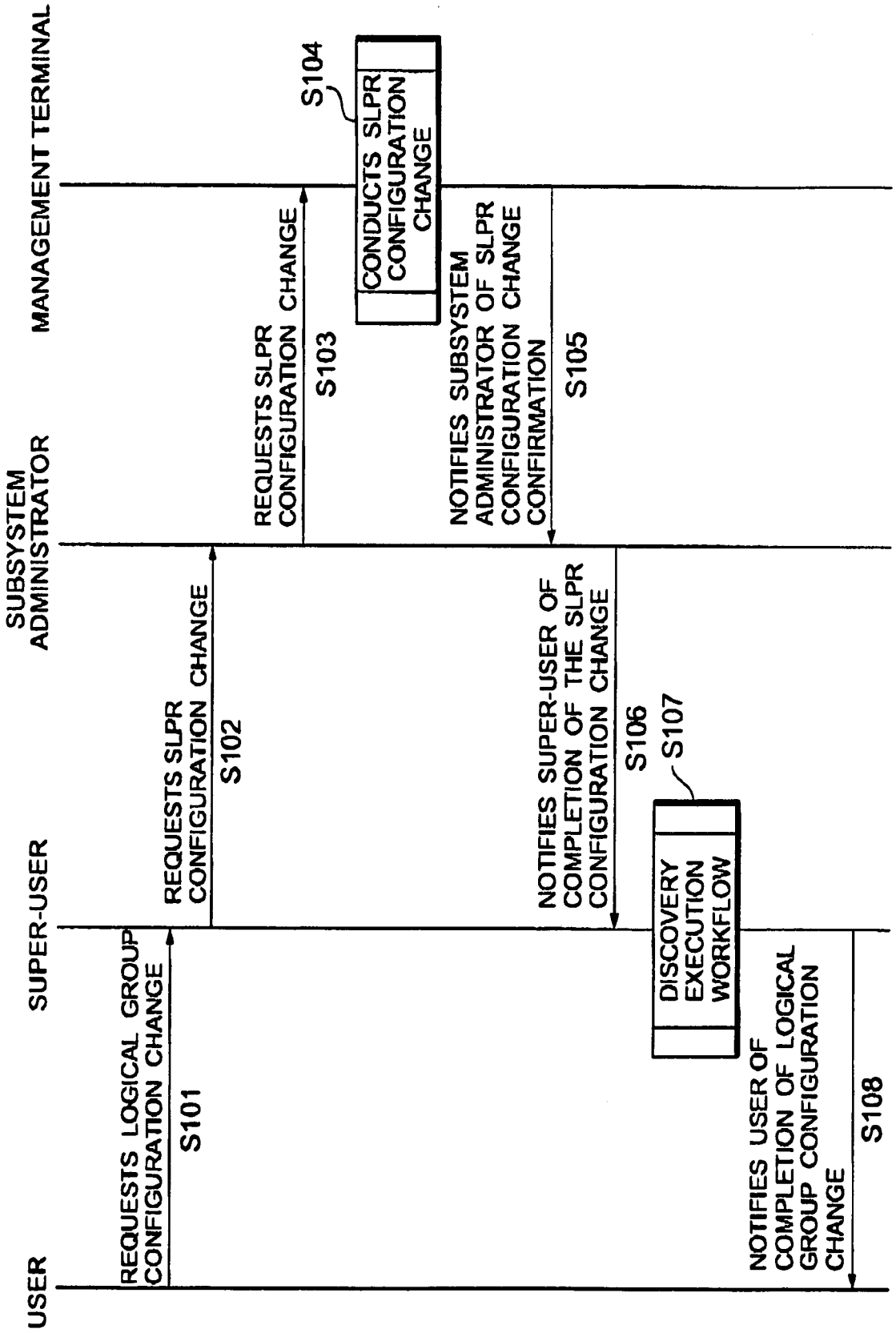
FIG. 23 shows a sequence illustrating a procedure for resource configuration change.

FIG. 23 shows a sequence schematically illustrating the procedure of the SLPR configuration change processing for the storage subsystem 600. When a user makes a request for logical group configuration change to the super-user (S101), the super-user makes a request for SLPR configuration change to the subsystem administrator (S102). The subsystem administrator makes the request for SLPR configuration change to the management terminal 160 via the user interface provided in the management terminal 160 (S103). Upon the request from the subsystem administrator, the management terminal 160 conducts the SLPR configuration change processing (104). The SLPR configuration change processing will be described later in detail.

After conducting the SLPR configuration change processing, the management terminal 160 notifies the subsystem administrator of the SLPR configuration change confirmation (S105). Having received the notification, the subsystem administrator notifies the super-user of the completion of the SLPR configuration change (S106). Then, the super-user implements a discovery execution workflow (S107). The discovery execution workflow will be explained later in detail. After implementing the discovery execution workflow, the super-user notifies the user of the completion of the logical group configuration change (S108).

Figure 24:
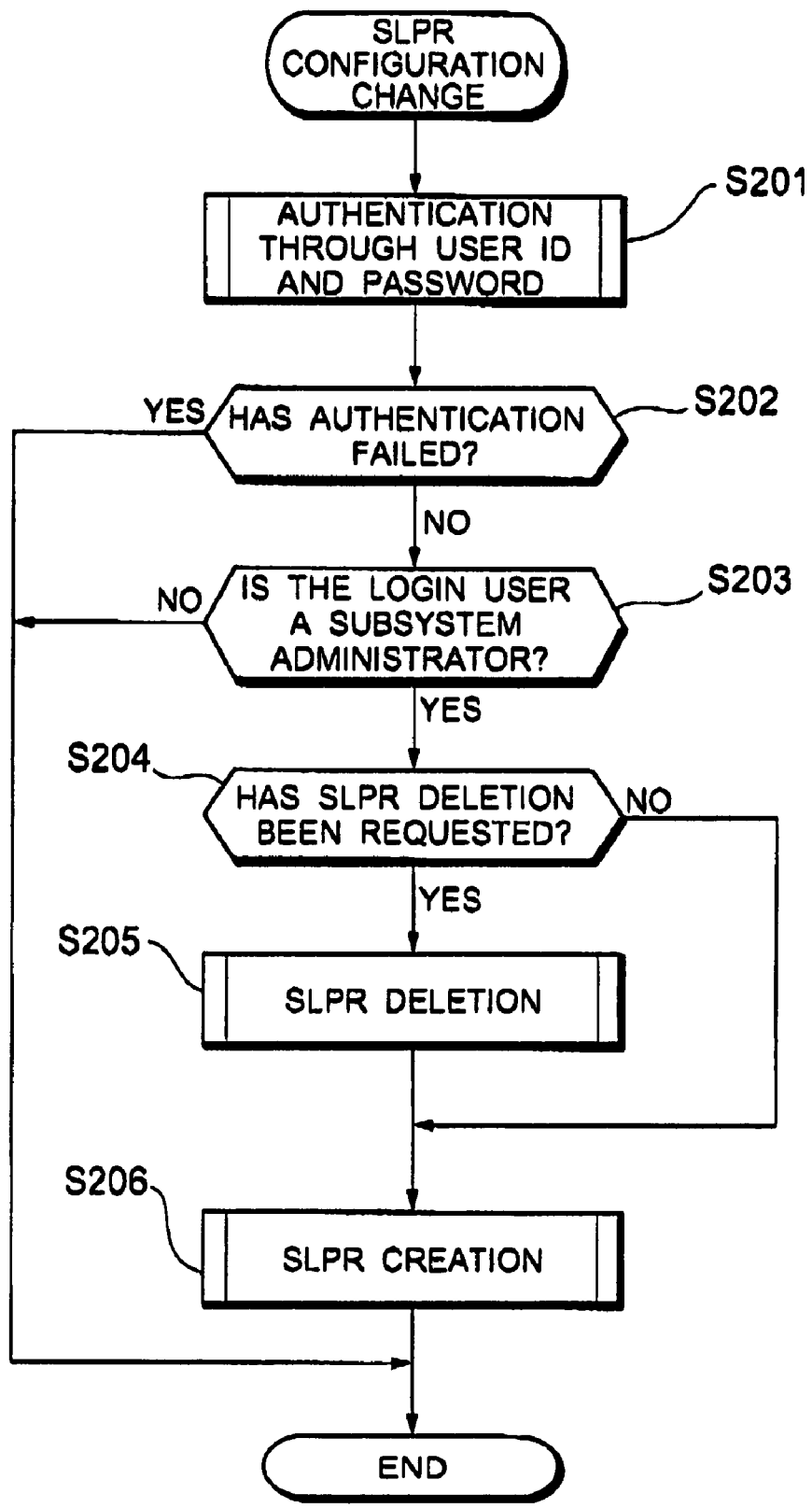
FIG. 24 is a flow chart of the SLPR configuration change processing routine.

FIG. 24 is a flow chart schematically illustrating the procedure of the SLPR configuration processing routine (S104). When this routine is called, the management terminal 160 authenticates a login-user's ID and password in response to the login request from the subsystem administrator (S201). The user ID and password authentication will be described later in detail. If the user ID and password authentication fails (S202; Yes), the login user is not an access authorization holder, therefore, the management terminal 160 exits the SLPR configuration change processing routine.

If the user ID and password authentication succeeds (S202; No), the management terminal 160 judges whether or not the login user is the subsystem administrator (S203). If the login user is not the subsystem administrator (S203; No), he/she cannot change the SLPR configurations in the storage subsystem 600, therefore, the management terminal 160 exits the SLPR configuration change processing routine.

If the login user is the subsystem administrator (S203; Yes) and if deletion of SLPRs is requested (S204; Yes), the management terminal 160 executes SLPR deletion processing (S205). SLPR deletion processing will be described later in detail. If SLPR deletion is not requested (S204; No) but SLPR creation processing is requested, the management terminal 160 executes the SLPR creation processing (S206). SLPR creation processing will be described later in detail. Incidentally, when adding a resource to an SLPR, the SLPR has to be deleted and a now SLPR has to be created.

Figure 25:
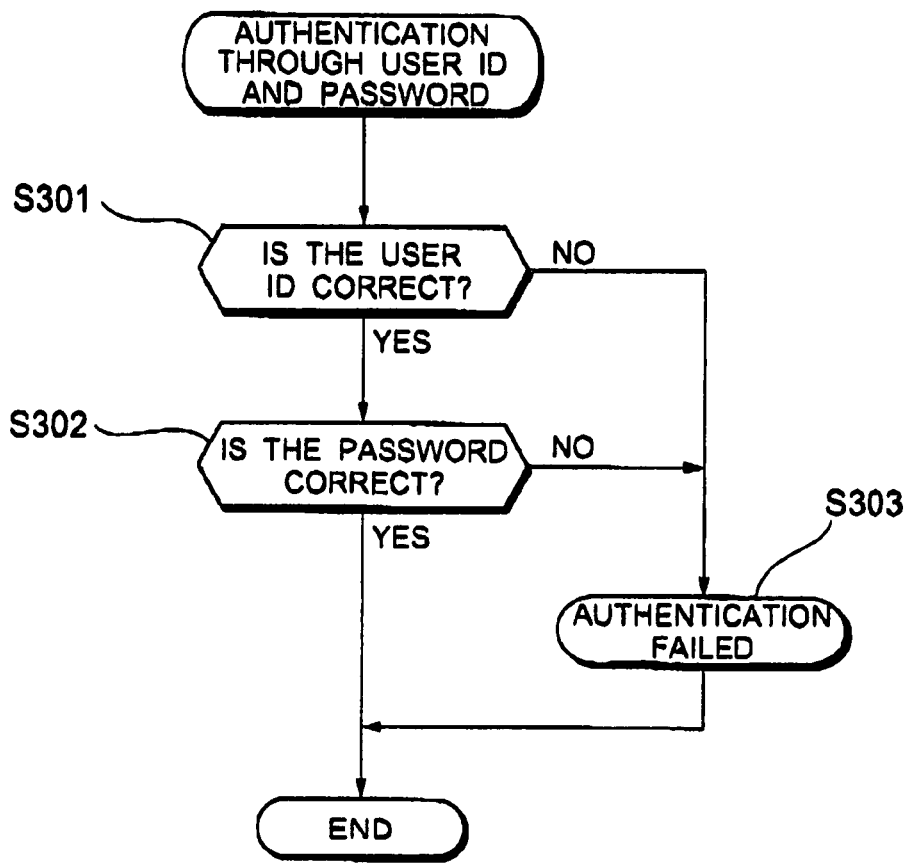
FIG. 25 is a flow chart of the user ID and password authentication processing routine.

FIG. 25 is a flow chart illustrating the aforementioned user ID and password authentication processing routine (S201). In this authentication processing, the management terminal 160 refers to the storage administrator table 901 stored in the shared memory 120 and judges whether or not the login user is an access authorization holder. If the user ID is correct (S301: Yes) and the password is also correct (S302; Yes), the management terminal 160 judges that the authentication has succeeded. However, if the user ID is incorrect (S301; No) or the password is incorrect (S302; No), the management terminal 160 judges that the authentication has failed (S303).

Figure 26:
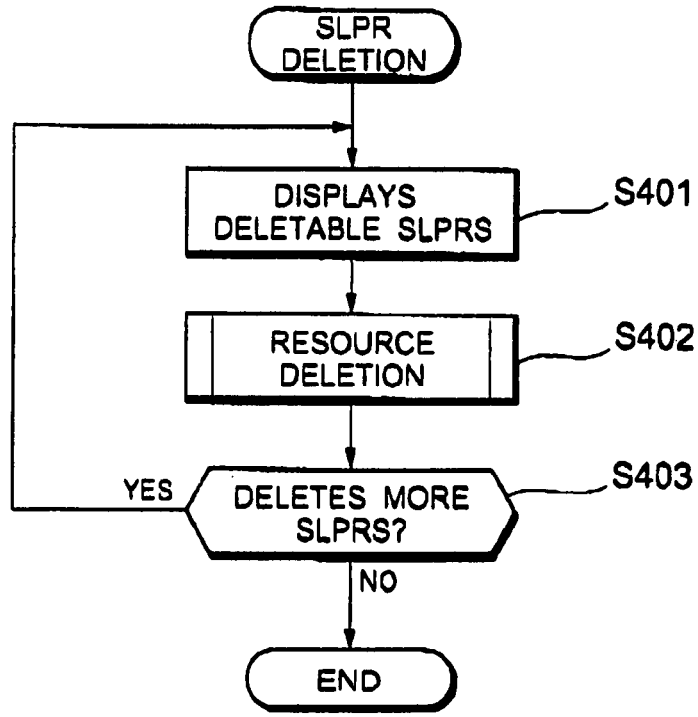
FIG. 26 is a flow chart of the SLPR deletion processing routine.

FIG. 26 is a flow chart illustrating a SLPR deletion processing routine (S205). When this routine is called, the management terminal 160 refers to the SLPR allocation-state table 909 stored in the shared memory 120 and displays the SLPRs whose "allocation state" boxes have "1" entered in them (S401). Next, the management terminal 160 executes the resource deletion processing (S402). The resource deletion processing will be described later in detail. Then, if it is necessary to delete more SLPRs (S403; Yes), the management terminal 160 returns to the step S401. If there is no need to delete more SLPRs (S403; No), it exits the SLPR deletion processing routine.

Figure 27:
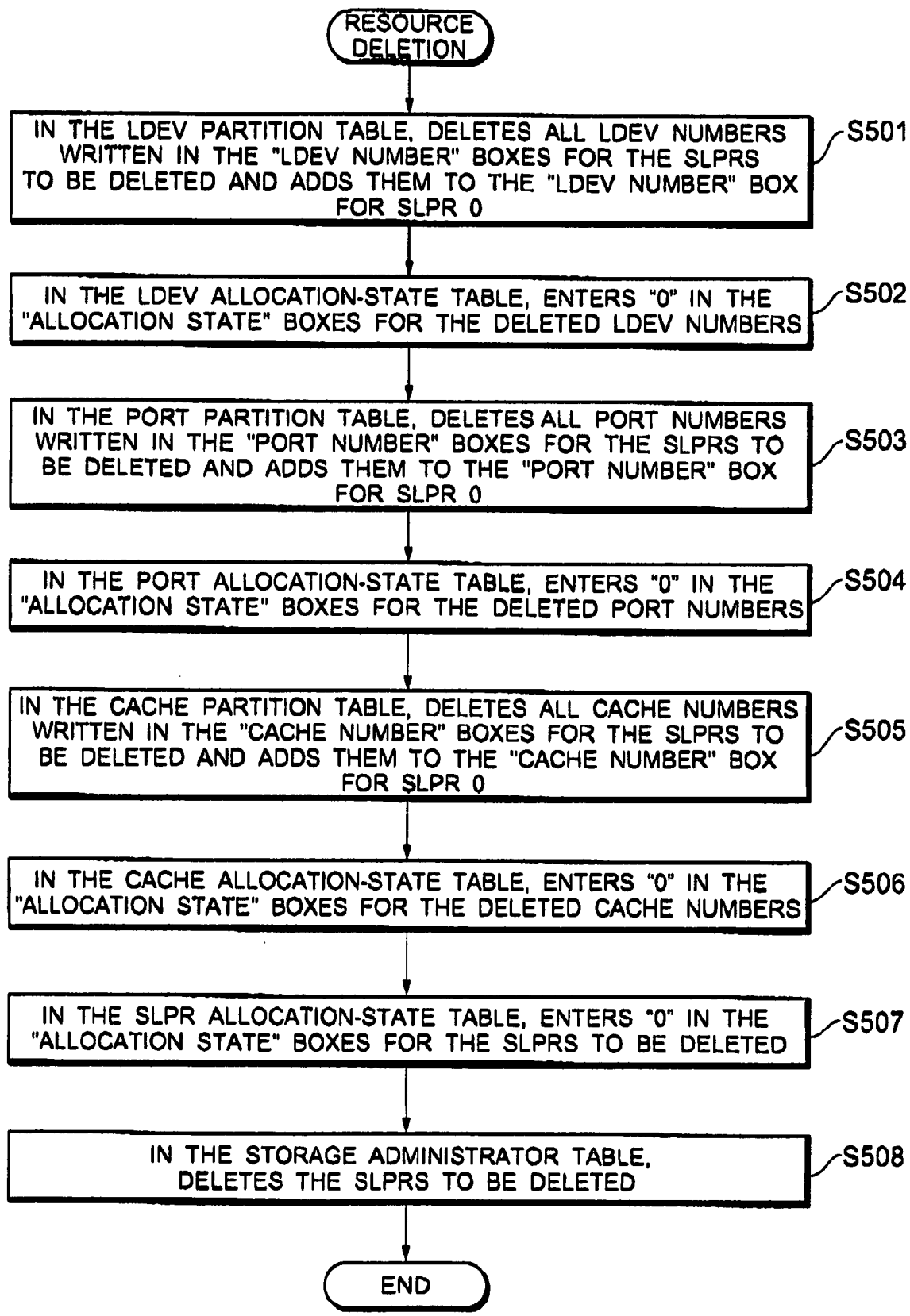
FIG. 27 is a flow chart of the resource deletion processing routine.

FIG. 27 is a flow chart illustrating a resource deletion processing routine (S402). When this routine is called, the management terminal 160 refers to the LDEV partition table 902 and deletes all LDEV numbers written in the "LDEV number" boxes for any SLPRs to be deleted and adds them to the "LDEV number" box for SLPR 0 (S501). Then it refers to the LDEV allocation-state table 906 and enters "0" in the "allocation state" boxes for the deleted LDEV numbers (S502).

Next, the management terminal 160 refers to the port partition table 903 and deletes all port numbers written in the "port number" boxes for the SLPRs to be deleted and adds them to the "port number" box for SLPR 0 (S503). Then it refers to the port allocation-state table 907 and enters "0" in the "allocation state" boxes for the deleted port numbers (S504).

Subsequently, the management terminal 160 refers to the cache partition table 905 and deletes all cache numbers written in the "cache number" boxes for the SLPRs to be deleted and adds them to the "cache number" box for SLPR 0 (S505). Then the management terminal 160 refers to the cache allocation-state table 908 and enters "0" in the "allocation state" boxes for the deleted cache numbers (S506).

Then the management terminal 160 refers to the SLPR allocation-state table 909 and enters "0" in the "allocation state" boxes for the SLPRs to be deleted (S507). Then it deletes the SLPRs to be deleted from the "managed object" boxes in the storage administrator table 901 (S508).

Figure 28:
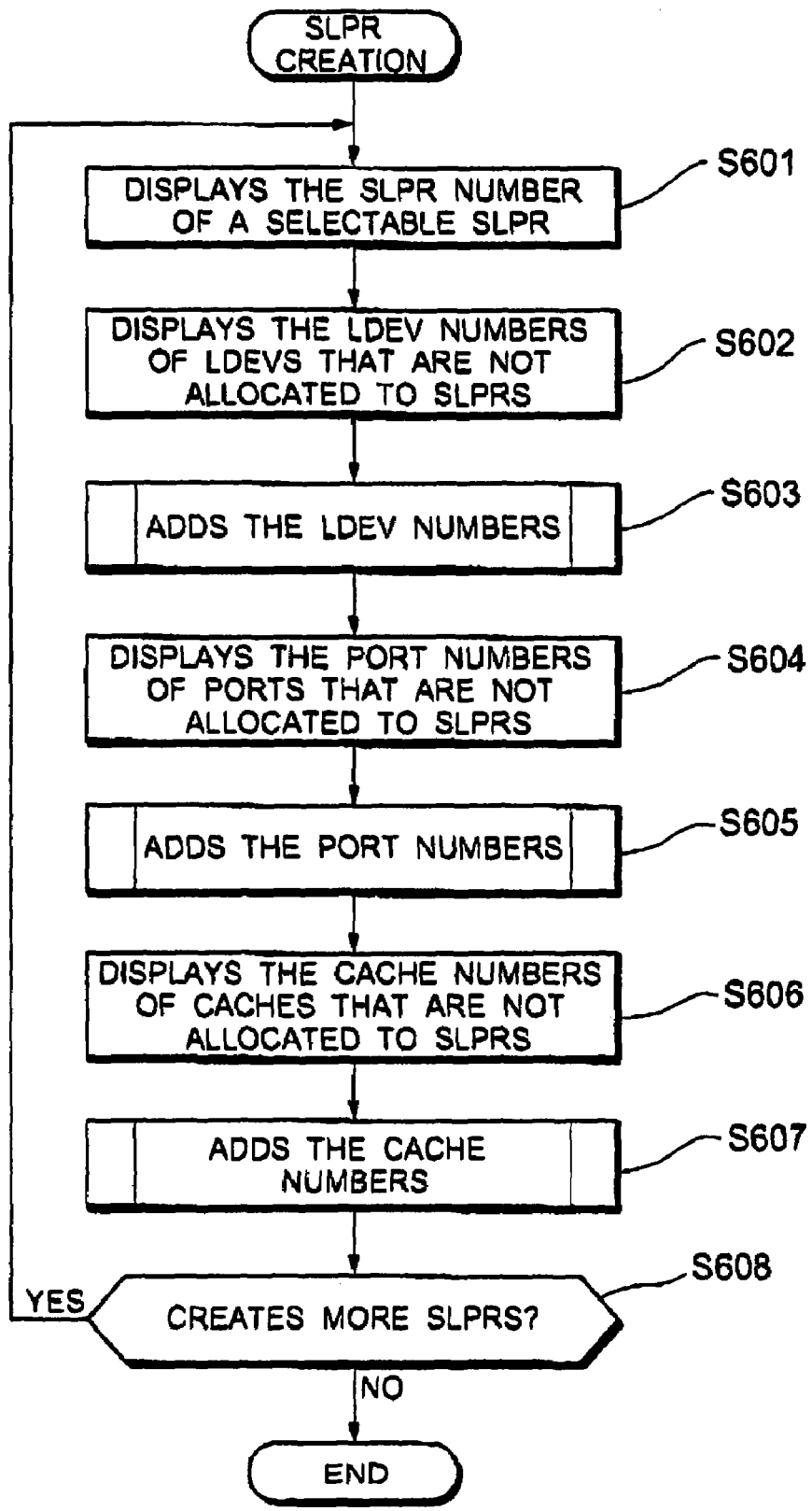
FIG. 28 is a flow chart of the SLPR creation processing routine.

FIG. 28 is a flow chart illustrating a SLPR creation processing routine (S206). When this routine is called, the management terminal 160 refers to the SLPR allocation-state table 909 and displays the SLPR number of an SLPR with no resource such as a port, LDEV, or cache memory allocated (S601). Then, it refers to the LDEV allocation-state table 906 and displays the LDEV numbers of LDEVs that are not allocated to any SLPR (S602). Then, it conducts processing to add any selected LDEV numbers to the "LDEV number" box for a selected SLPR in the LDEV partition table 902 (S603). The LDEV number addition processing will be described later in detail.

Next, the management terminal 160 refers to the port allocation-state table 906 and displays the port numbers of ports that are not allocated to any SLPR (S604). Then, it executes processing to add any selected port numbers to the selected SLPR (S605). The port number addition processing will be described later in detail.

Subsequently, the management terminal 160 refers to the cache allocation-state table 908 and displays the cache numbers of caches that are not allocated to any SLPR (S606). Then, it executes the processing to add any selected cache numbers to the selected SLPR (S607). The cache number addition processing will be described later in detail.

In order to create more SLPRs (S608; Yes), the management terminal 160 returns to the processing step of S601. If no more SLPRs are to be created, (S608; No), it exits the SLPR creation processing routine.

Figure 29:
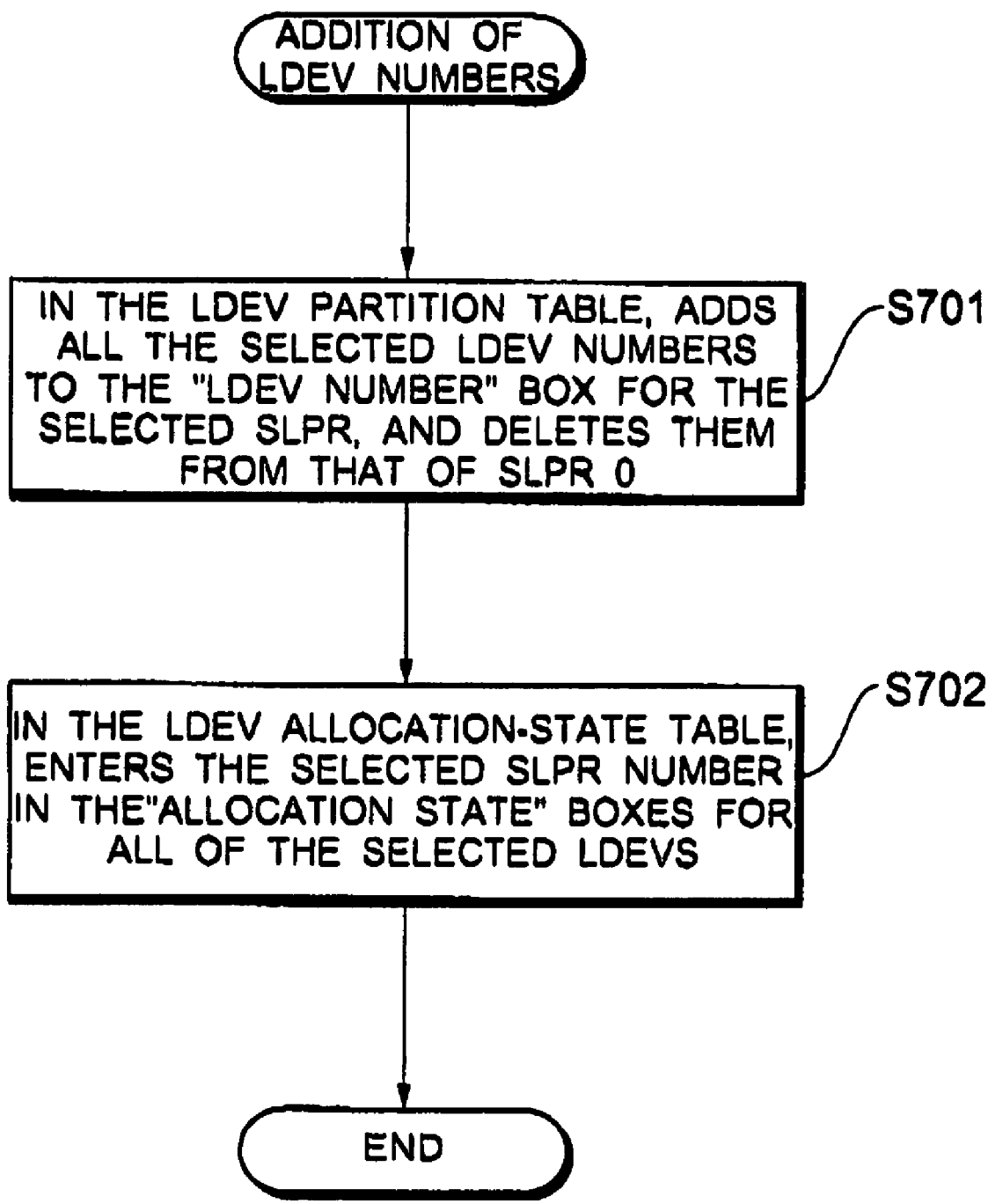
FIG. 29 is a flow chart of the LDEV number(s) addition processing routine.

FIG. 29 is a flow chart illustrating a LDEV number addition processing routine (S603). When this routine is called, the management terminal 160 refers to the LDEV partition table 902 and adds all the selected LDEV numbers to the "LDEV number" box for the selected SLPR, and deletes them from that of SLPR 0 (S701). Then, it refers to the LDEV allocation-state table 906 and records the selected SLPR number in the "allocation state" boxes for all of the selected LDEVs (S702).

Figure 30:
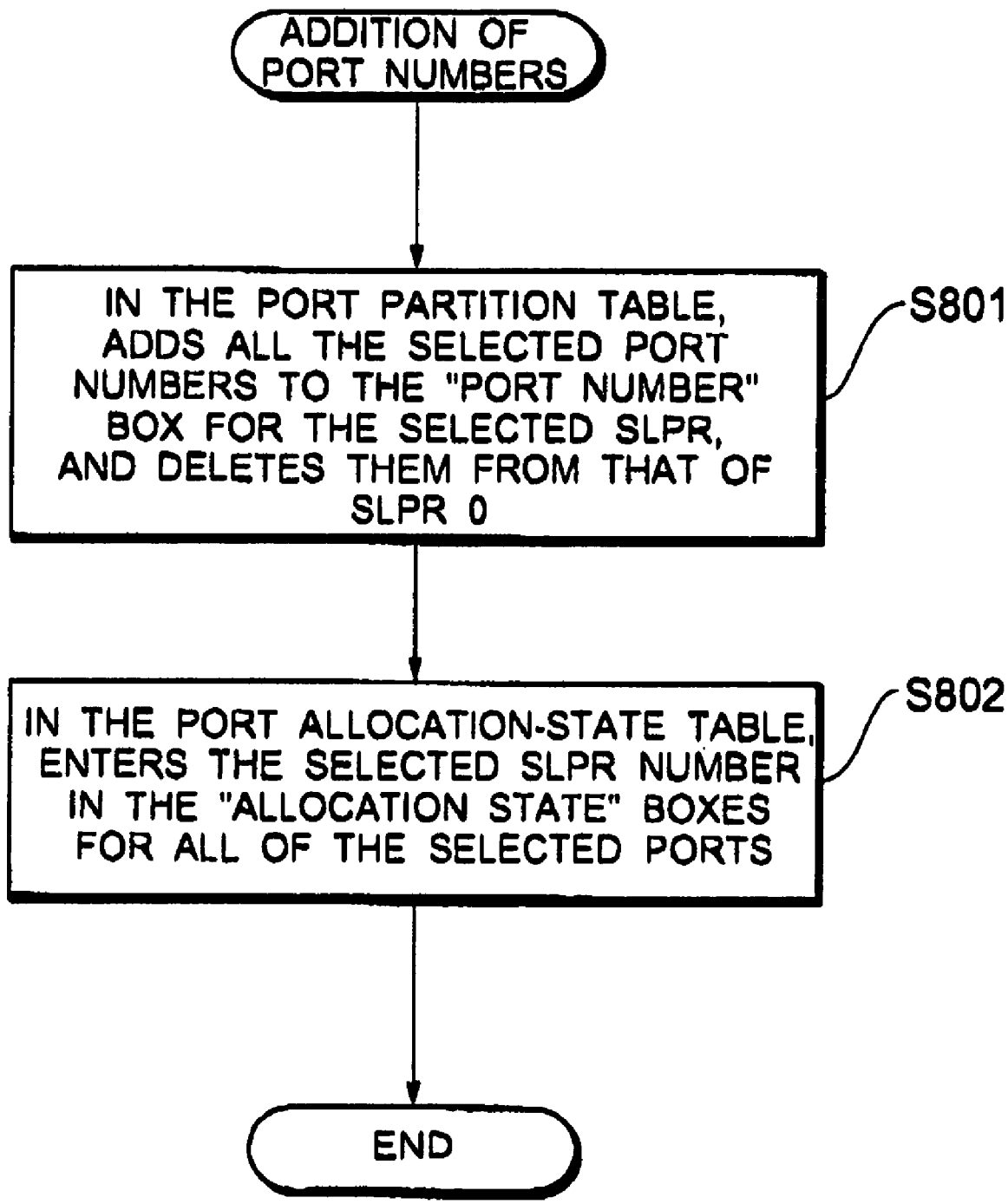
FIG. 30 is a flow chart of the port number(s) addition processing routine.

FIG. 30 is a flow chart illustrating a port number addition processing routine (S605). When this routine is called, the management terminal 160 refers to the port partition table 903 and adds all the selected port numbers to the "port number" box for the selected SLPR, and deletes them from that of SLPR 0 (S801). Then, it refers to the port allocation-state table 907 and records the selected SLPR number in the "allocation state" boxes for all of the selected ports (S802).

Figure 31:
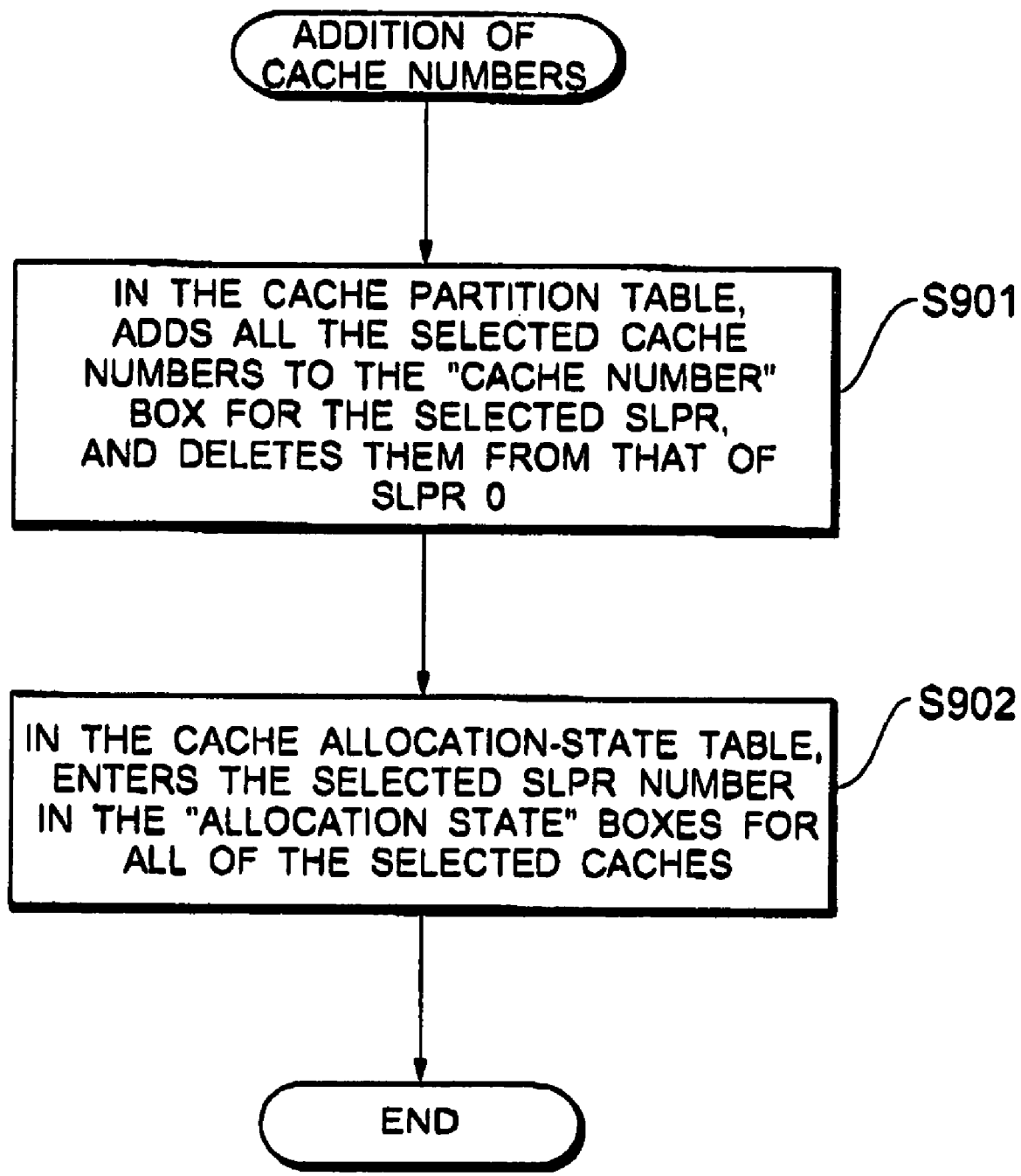
FIG. 31 is a flow chart of the cache number(s) addition processing routine.

FIG. 31 is a flow chart illustrating a cache number addition processing routine (S607). When this routine is called, the management terminal 160 refers to the cache partition table 905 and adds all the selected cache numbers to the "cache number" box for the selected SLPR, and deletes them from that of SLPR 0 (S901). Then, it refers to the cache allocation-state table 908 and records the selected SLPR number in the "allocation state" boxes for all of the selected caches (S902).

Figure 32:
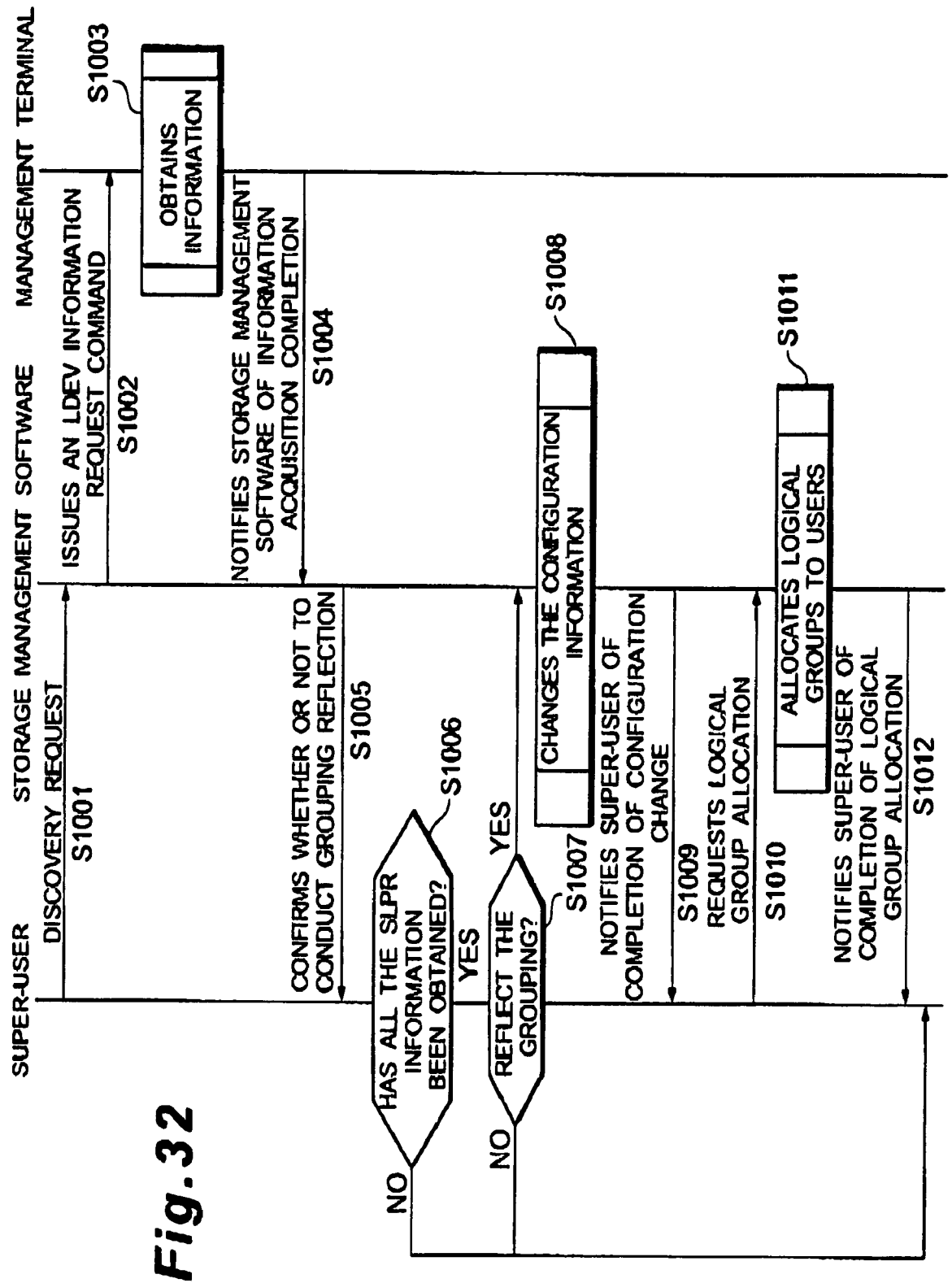
FIG. 32 shows a sequence of discovery execution work flow.

FIG. 32 shows a sequence schematically describing the entire processing of the aforementioned discovery execution workflow (S107). When the super-user makes a discovery request to the storage management software 800 via the user interface (S1001), the storage management software 800 issues an LDEV information request command to the management terminal 160 (S1002). The LDEV information request command is a command requesting acquisition of the LDEV information set for the storage subsystem 600. This command includes the super-user's user ID and password and the SLPR numbers of the SLPRs whose LDEV information is being requested. A plurality of SLPR numbers may be designated. When the acquisition of the LDEV information of all the SLPRs in the storage subsystem 600 is required, "ALL" may be designated instead of designating the SLPR numbers.

Having received the LDEV information request command, the management terminal 160 obtains the LDEV information from the storage subsystem 600 (S1003), transmits the LDEV numbers and the SLPR numbers to the storage management software 800 (S1003), and issues an information acquisition completion notice (S1004). Upon receiving such notice, the storage management software 800 confirms with the super-user whether or not to reflect the LDEV grouping set for the storage subsystem 600 in the grouping of the storage groups managed by the storage management software 800 (S1005). Confirmation with the super-user may be preferably conducted, for example, by displaying a window or similar on the user interface provided in the management server 700. The reason for requiring confirmation regarding the grouping reflection will be described later.

At this time, if the super-user has obtained the configuration information of all the SLPRs (S1006; Yes) and desires to reflect the LDEV configurations of the respective SLPRs in the storage subsystem 600 in the LDEV configurations of the respective logical groups in the storage management software 800 (S1007; Yes), the storage management software 800 changes the LDEV configurations of the respective logical groups it manages so that the LDEV configurations on both sides match one another completely (S1008). The LDEV configuration information change processing will be described later in detail.

Next, the storage management software 800 notifies the super-user of the completion of the LDEV configuration change (S1009). Upon receiving such notice, the super-user makes a request for logical group allocation to the storage management software 800 (S1010). Then, the storage management software 800 executes the processing for allocating the logical groups to the users (S1011). The logical group allocation processing will be described later in detail. Subsequently, the storage management software 800 notifies the super-user of the completion of the logical group allocation processing (S1012).

Figure 33:
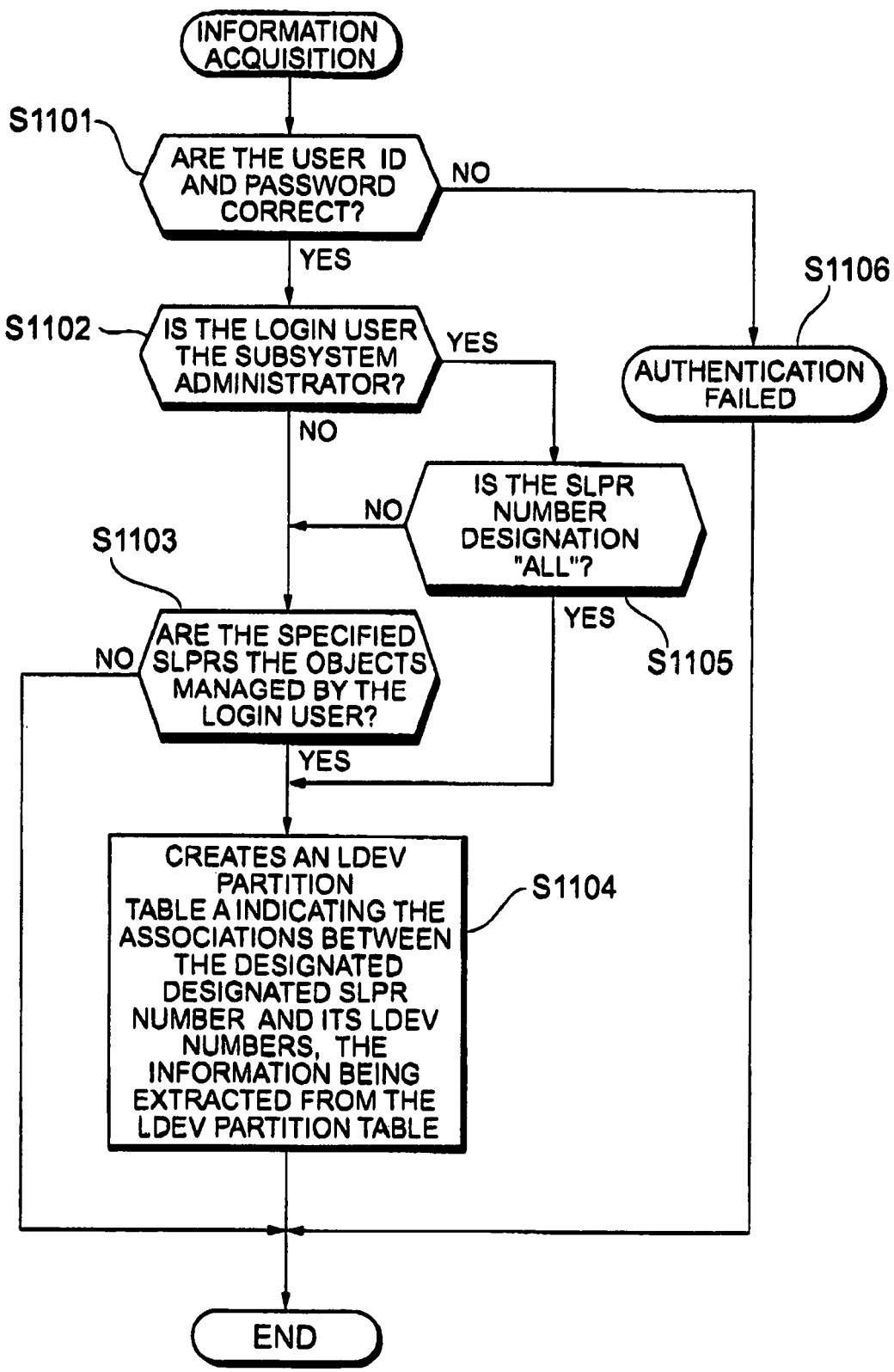
FIG. 33 is a flow chart of the LDEV information acquisition processing routine.

FIG. 33 is a flow chart illustrating a LDEV information acquisition processing routine (S1003). When this routine is called, the management terminal 160 refers to the storage administrator table 901 and checks whether or not the user ID and password contained in the LDEV information request command match any of the user IDs and passwords of the subsystem administrator and the partition administrators (S1101). If either of the user ID and the password is incorrect (S1101; No), authentication fails (S1106) and the management terminal 160 exits the LDEV information acquisition processing routine.

If the authentication through the user ID and password succeeds (S1101; Yes), the management terminal 160 checks whether or not the login user is the subsystem administrator (S1102). If the login user is not the subsystem administrator (S1102; No) but the SLPR numbers in the LDEV information request command indicate the objects managed by the login user and for which he/she has access authorization (S1103; Yes), the management terminal 160 extracts, from the LDEV partition table 902, the information concerning the associations between the SLPR numbers designated in the command and the corresponding LDEV numbers and creates a table (hereinafter called the "LDEV partition table A") indicating the associations between the SLPR numbers and its LDEV numbers, the associations being extracted from the table (S1104). The LDEV partition table A is a copy of the LDEV partition table 902.

If the login user is the subsystem administrator (S1102; Yes) and the SLPR number designation contained in the LDEV information request command is "ALL" (S1105; Yes), or the SLPR number designation is not "ALL" but the SLPR numbers contained in the command belong to the objects for which the login user has access authorization (S1103; Yes), the management terminal 160 extracts, from the LDEV partition table 902, the information concerning the associations between the SLPR numbers designated in the command and the corresponding LDEV numbers and creates the LDEV partition table A indicating the associations between the SLPR numbers and the corresponding LDEV numbers extracted from the table 902 (S1104).

Figure 34:
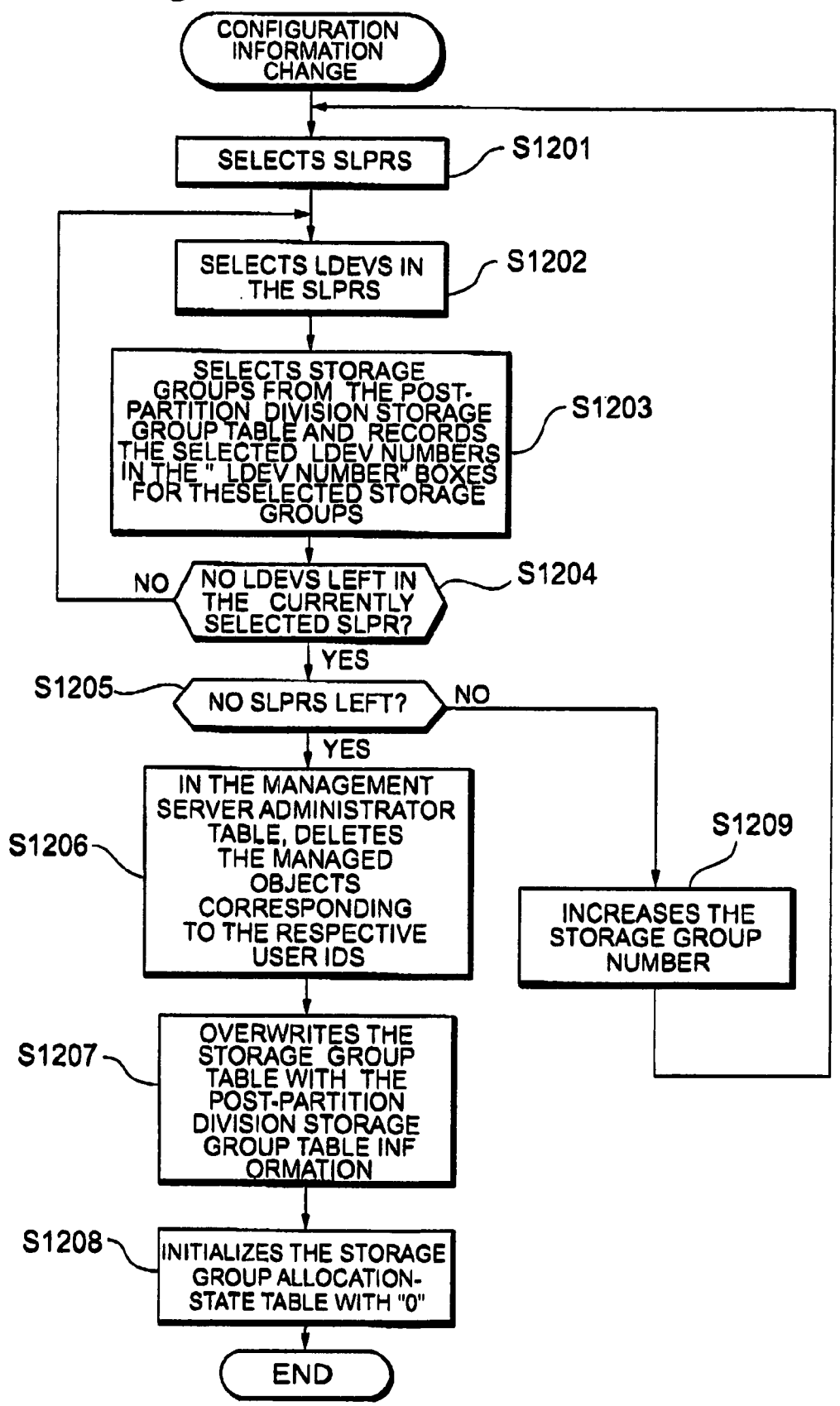
FIG. 34 is a flow chart of the LDEV configuration information change processing routine.

FIG. 34 is a flow chart illustrating an LDEV configuration information change processing routine (S1008). When this routine is called, as shown in FIG. 36, the storage management software 800 selects the SLPRs recorded in the LDEV partition table A one by one in ascending order by SLPR number (S1201). Then, it selects all the LDEVs in the selected SLPRs one by one (S1202). Next, it selects storage groups from the post-partition division storage group table 803 and records the selected LDEV numbers in the "LDEV number" boxes for the selected storage groups, as shown with the arrow in FIG. 36 (S1203). At this time, the same LDEV numbers must be recorded in the "LDEV number" boxes for both the storage group "m" and the SLPR "m." Here, "m" is an integer from 0 to "m" inclusive but not more than "M". "M" is a maximum value for the SLPR numbers.

As described above, the storage management software 800 records the LDEV numbers sequentially from the LDEV partition table A to the post-partition division storage group table 803. When there is an unselected LDEV number left in a currently selected SLPR in the LDEV partition table A (S1204; No), it repeats the steps S1202 to S1204. When all the LDEV numbers in the currently selected SLPR in the LDEV partition table A have been selected (S1204; Yes), it checks whether or not there are any unselected SLPRs left in the LDEV partition table A (S1205). If there are any unselected SLPRs left (S1205; No), the storage management software 800 increases the storage group number by one (S1209) and repeats the steps S1201 to S1205.

When the storage management software 800 has selected all the SLPRs in the LDEV partition (S1205; Yes), it deletes the managed objects corresponding to the respective user IDs in the management server administrator table 804 (S1206). Then, it overwrites the storage group table 802 with the information in the post-partition division storage group table 803 (S1207) and initializes the storage group allocation-state table 806 with "0" (S1208).

Figure 35:
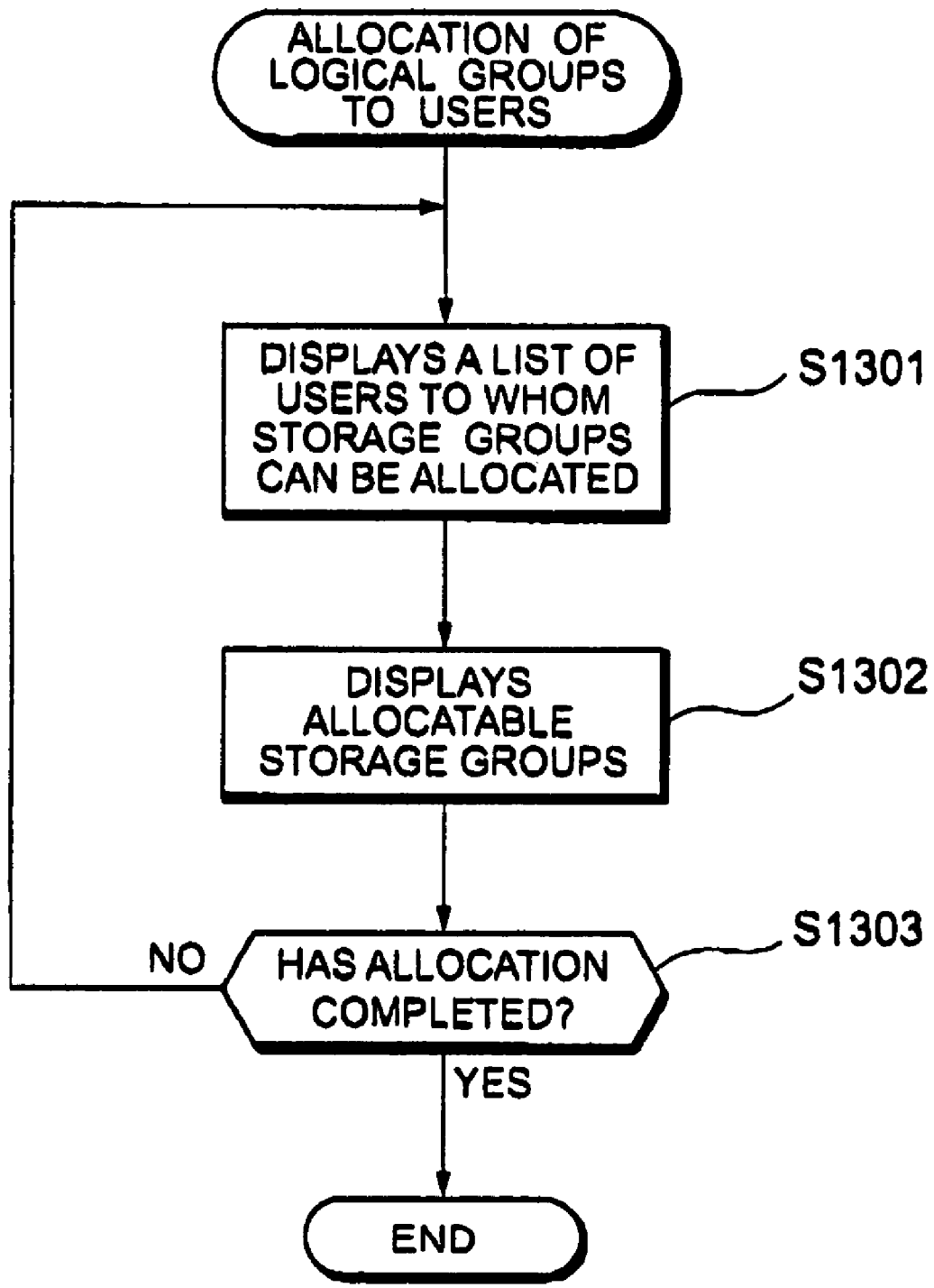
FIG. 35 is a flow chart of a logical group allocation processing routine.

FIG. 35 is a flow chart illustrating the logical group allocation processing routine (S1011). When this routine is called, the storage management software 800 refers to the management server administrator table 804 and displays, on the user interface, a list of users to whom storage groups can be allocated (S1301). Then, it refers to the storage group allocation-state table 806, displays the storage group numbers whose "allocation-state" boxes contain "0" (S1302), and allocates those storage groups to the users (S1303).

Figure 37:
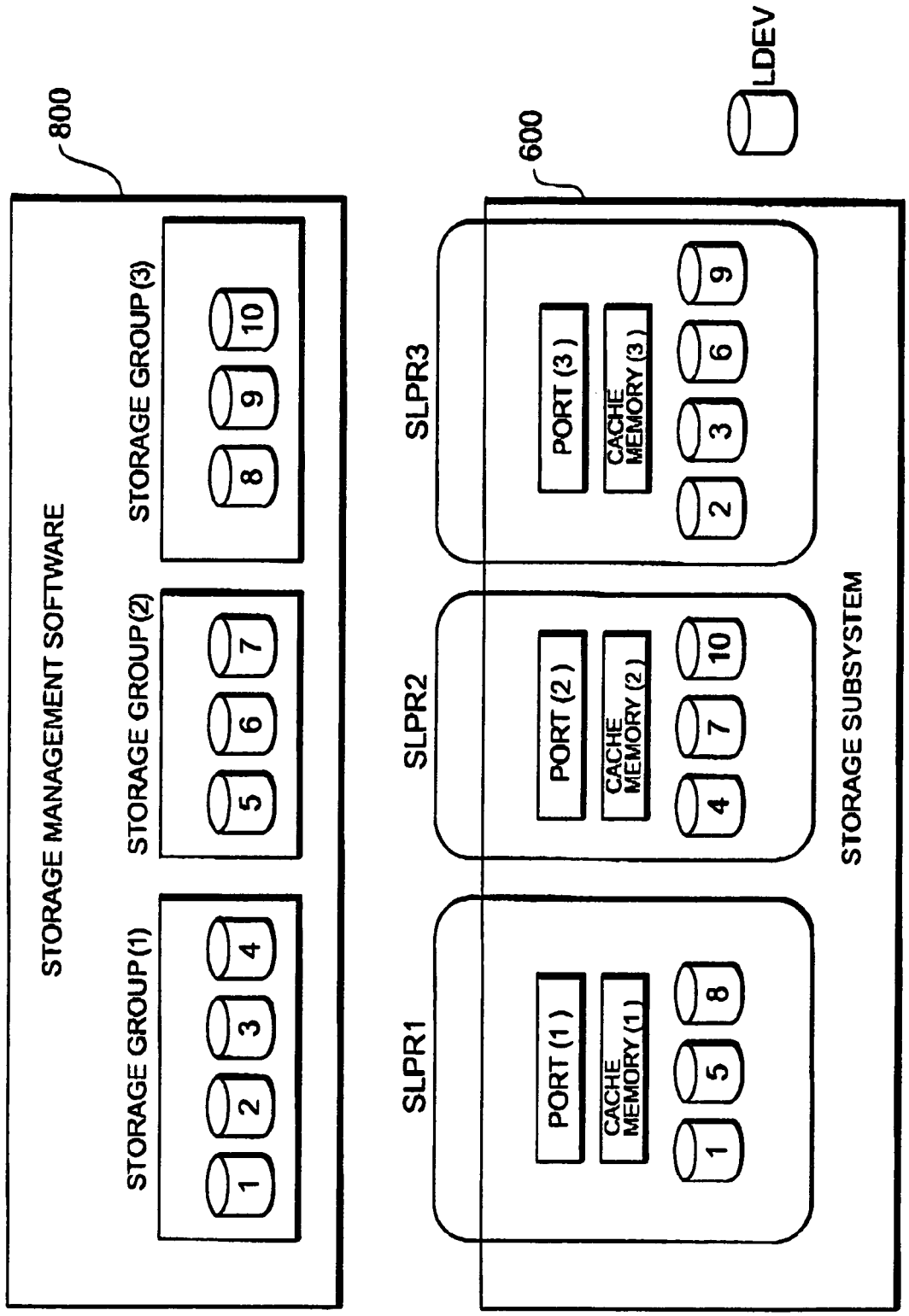
FIG. 37 shows associations between groupings.

Hereafter, the reason for requiring confirmation regarding the grouping reflection in the above stop S1005 is explained. In the storage subsystem 600 having the SLPR function, partition division is conducted not only for providing the resources to plural users but also for guaranteeing the performance of the storage subsystem 600 itself. For example, the LDEVs have various types; some are frequently accessed while others are infrequently accessed but their performance is desired to be guaranteed to a certain extent. In this situation, the same type of LDEVs may be grouped together in a SLPR so that the storage subsystem's performance can be guaranteed. For example, in FIG. 37, assuming that LDEVs 1, 5, and 8 are frequently accessed; LDEVs 4, 7, and 10 are infrequently accessed but their performance is required to be guaranteed to a certain extent; and LDEVs 2, 3, 6, and 9 are other types of LDEVs. If the frequently accessed LDEVs 1, 5, and 8 are grouped together in SLPR 1, it is possible to prevent the degradation in access performance of the rest of the LDEVs. It is also possible to allocate a large storage area to the cache memory 2 which temporarily stores the data to be input/output to/from LDEVs 4, 7, and 10 whose performance is desired to be guaranteed to a certain extent, thereby enabling to gurantee the storage subsystem 600.

On the other hand, the settings of the storage groups managed by the storage management software 800 are made in consideration of user management. Accordingly, there are cases in which LDEVs having various performances are mixed in one storage group. Therefore, if the LDEV grouping set for the storage subsystem 600 is reflected in the grouping of the storage groups managed by the storage management software 800, the LDEV configurations of the storage groups set by the users will collapse. Therefore, when the resources in the storage subsystem 600 are allocated to the divided partitions, in terms of guaranteeing the performance of thereof, it is not always necessary to reflect the LDEV grouping set for the storage subsystem 600 in the grouping of the storage groups managed by the storage management software 800. For this reason, confirmation regarding whether or not to reflect the grouping is required in the step S1005.

According to this embodiment, the storage management software 800 groups the LDEVs into storage groups such that the group configurations of the LDEVs constituting the storage groups match the LDEV group configurations set for the respective SLPRs in the storage subsystem 600. Accordingly, any mismatch between the group configurations can be prevented.

Moreover, in terms of guaranteeing the performance of the storage subsystem 600 and managing the storage subsystem 600, it is possible to choose whether or not to reflect the LDEV group configurations set for the respective SLPRs in the storage subsystem 600 in the group configurations of LDEVs constituting storage groups.

We claim:

1. A computer program product for grouping a plurality of storage resources provided by a storage system into storage groups, said computer program product comprising:
    a computer program which causes a management server to execute processing for grouping the plurality of storage resources provided by said storage system into storage groups; and
    a computer-readable storage medium having the computer program tangibly embodied thereon,
    wherein the computer program causes said management server to perform the steps of:

obtaining storage resource configuration information set for each of a number of logical partitions in the storage system; and transmitting said storage resource configuration information to an administrator who manages one or more of the storage groups, and who reviews said transmitted storage resource configuration information, wherein only upon approval of the administrator, the computer program causes said management server to further perform the steps of:

grouping the storage resources into storage groups such that a storage resource group configuration individually set for the logical partitions in the storage system matches a group configuration of the storage resources constituting the storage groups; and updating associations between one or more of the storage groups and the administrator, based on partition administrator identification information set for each of the logical partitions in the storage system, wherein the storage resource configuration information is transmitted from the storage system to the management server, and then transmitted to the administrator, wherein the storage resource configuration information in the management server is changed in response to the approval by the administrator, and wherein the approval is based on the transmitted storage resource configuration information.

2. A computer program product for grouping a plurality of storage resources provided by a storage system into storage groups, said computer program product comprising:

a computer program which causes a management server to execute processing for grouping the plurality of storage resources provided by said storage system into storage groups; and a computer-readable storage medium having the computer program tangibly embodied thereon, wherein the computer program causes said management server to perform the steps of:

obtaining storage resource configuration information set for each of a number of logical partitions in the storage system;

executing user authentication for a login user who tries to change the configuration of the storage groups to judge whether or not the login user is an authorized user who is allowed to change the configuration of the storage groups;

when the login user is judged to be the authorized user, the computer program causes said management server to further perform the steps of:

transmitting configuration information to the authorized user;

prompting the authorized user to review the transmitted configuration information, and to determine whether or not to change the configuration of one or more of the storage groups;

when the authorized user determines to change the configuration of the storage groups, the computer program causes said management server to perform the steps of:

grouping the storage resources into storage groups such that a storage resource group configuration individually set for the logical partitions in the storage system matches a group configuration of the storage resources constituting the storage groups; and updating associations between one or more of the storage groups and the authorized user, based on partition administrator identification information set for each of the logical partitions in the storage system;

wherein the configuration information is transmitted from the storage system to the management server, and then transmitted to the authorized user, wherein the configuration information in the management server is changed in response to the determination by the authorized user, and wherein the determination to change the configuration of one or more of the storage groups is based on the transmitted configuration information.

3. A method for grouping a plurality of storage resources provided by a storage system into storage groups, the storage system including a management server for implementing the method, the method comprising the steps of:

obtaining storage resource configuration information set for each of a number of logical partitions in the storage system; and transmitting said storage resource configuration information to an administrator who manages one or more of the storage groups, and who reviews said transmitted storage resource configuration information, wherein only upon approval of the administrator, the computer method further comprises the steps of:

grouping the storage resources into storage groups such that a storage resource group configuration individually set for the logical partitions in the storage system matches a group configuration of the storage resources constituting the storage groups; and updating associations between one or more of the storage groups and the administrator, based on partition administrator identification information set for each of the logical partitions in the storage system, wherein the storage resource configuration information is transmitted from the storage system to the management server, and then transmitted to the administrator, and wherein the storage resource configuration information in the management server is changed in response to the approval by the administrator, and wherein the approval is based on the transmitted storage resource configuration information.

4. A method for grouping a plurality of storage resources provided by a storage system into storage groups, the storage system including a management server for implementing the method, the method comprising the steps of:

obtaining storage resource configuration information set for each of a number of logical partitions in the storage system;

executing user authentication for a login user who tries to change the configuration of the storage groups to judge whether or not the login user is an authorized user who is allowed to change the configuration of the storage groups;

when the login user is judged to be the authorized user, the method further comprises the steps of:

transmitting configuration information to the authorized user;

prompting the authorized user to review the transmitted configuration information, and to determine whether or not to change the configuration of one or more of the storage groups;

when the authorized user determines to change the configuration of the storage groups, the method further comprises the steps of:

grouping the storage resources into storage groups such that a storage resource group configuration individually set for the logical partitions in the storage system matches a group configuration of the storage resources constituting the storage groups; and updating associations between one or more of the storage groups and the authorized user, based on partition administrator identification information set for each of the logical partitions in the storage system;

wherein the configuration information is transmitted from the storage system to the management server, and then transmitted to the authorized user, wherein the configuration information in the management server is changed in response to the determination by the authorized user, and wherein the determination to change the configuration of one or more of the storage groups is based on the transmitted configuration information.

5. A storage system comprising:
a management server, wherein the management server comprises:
  a central processing unit (CPU);
  memory;
  storage management software;
  a storage group table; and
  an administrator table,
wherein the storage management software groups a plurality of storage resources provided by the storage system into storage groups,
wherein the storage group table registers associations between one or more of the storage resources and one or more of the storage groups,
wherein the administrator table registers associations between one or more of the storage groups and an administrator who manages one or more of the storage groups,
wherein storage resource group configuration information is transmitted to the administrator who reviews the transmitted storage resource group configuration information,
wherein only upon approval of the administrator, the storage management software updates the associations registered in the storage group table such that a storage resource group configuration individually set for the logical partitions in the storage system matches a group configuration of the storage resources constituting the storage groups,
wherein the storage management software updates the associations registered in the administrator table, based on partition administrator identification information individually set for the logical partitions in the storage system,
wherein the storage resource configuration information is transmitted from the storage system to the management server, and then transmitted to the administrator,
wherein the storage resource configuration information in the management server is changed in response to the approval by the administrator, and
wherein the approval is based on the transmitted storage resource configuration information.

6. A storage system comprising:
a management server, wherein the management server comprises:
  a central processing unit (CPU);
  memory;
  storage management software;
  a storage group table; and
  an administrator table,
wherein the storage management software groups a plurality of storage resources provided by a storage system into storage groups,
wherein the storage group table registers associations between one or more of the storage resources and one or more of the storage groups,
wherein the administrator table registers associations between one or more of the storage groups and an authorized user who is allowed to change the configuration of the storage group table,
wherein the storage management software updates the associations registered in the administrator table, based on partition administrator identification information individually set for the logical partitions in the storage system,
wherein said storage management software executes user authentication for a login user who tries to change the configuration of the storage group table and judges whether or not the login user is the authorized user who is allowed to change the configuration of the storage group table,
wherein when the login user is judged to be the authorized user, said storage management software transmits configuration information to the authorized user, and prompts the authorized user to review the transmitted configuration information, and to determine whether or not to change the configuration of the storage group table,
wherein when the authorized user determines to change the configuration of the storage group table, said storage management software updates the associations registered in the storage group table such that a storage resource group configuration individually set for the logical partitions in the storage system matches a group configuration of the storage resources constituting the storage groups,
wherein the configuration information is transmitted from the storage system to the management server, and then transmitted to the authorized user,
wherein the configuration information in the management server is changed in response to the determination by the authorized user, and
wherein the determination to change the configuration of one or more of the storage groups is based on the transmitted configuration information.

* * * * *